United States Patent
Kawashima et al.

(10) Patent No.: US 7,620,900 B2
(45) Date of Patent: Nov. 17, 2009

(54) SYSTEM AND METHOD FOR ACCESSING DATA USING A PLURALITY OF INDEPENDENT POINTING DEVICES

(75) Inventors: Isao Kawashima, Kanagawa (JP); Mario Tokoro, Tokyo (JP)

(73) Assignee: Sony Corporation, Tokyo (JP)

( * ) Notice: Subject to any disclaimer, the term of this patent is extended or adjusted under 35 U.S.C. 154(b) by 409 days.

(21) Appl. No.: 09/841,957

(22) Filed: Apr. 25, 2001

(65) Prior Publication Data
US 2002/0059308 A1 May 16, 2002

(30) Foreign Application Priority Data

| | | | |
|---|---|---|---|
| Apr. 27, 2000 | (JP) | | 2000-127232 |
| Apr. 27, 2000 | (JP) | | 2000-127233 |
| Apr. 27, 2000 | (JP) | | 2000-127234 |

(51) Int. Cl.
*G06F 3/048* (2006.01)
(52) U.S. Cl. .................. 715/754; 715/856
(58) Field of Classification Search ........... 345/157, 345/158, 163, 733, 738, 750, 751, 753; 709/205; 715/754, 856
See application file for complete search history.

(56) References Cited

U.S. PATENT DOCUMENTS

| | | | | |
|---|---|---|---|---|
| 5,515,491 A | | 5/1996 | Bates et al. ............. 345/754 |
| 5,548,304 A | * | 8/1996 | Yoshino et al. ......... 715/856 |
| 5,675,390 A | * | 10/1997 | Schindler et al. ....... 715/717 |
| 5,796,396 A | | 8/1998 | Rich | |
| 5,900,869 A | * | 5/1999 | Higashio ............ 345/751 |
| 5,917,472 A | * | 6/1999 | Perala ................ 345/157 |
| 5,944,791 A | | 8/1999 | Scherpbier | |
| 6,175,842 B1 | * | 1/2001 | Kirk et al. ............ 715/513 |
| 2002/0026478 A1 | * | 2/2002 | Rodgers et al. ........ 709/205 |

FOREIGN PATENT DOCUMENTS

| | | |
|---|---|---|
| JP | 3-75693 | 3/1991 |
| JP | 7-129364 | 5/1995 |
| JP | 8-22370 | 1/1996 |
| WO | WO 01 69384 | 9/2001 |

OTHER PUBLICATIONS

Patent Abstracts of Japan vol. 1997, No. 3, Mar. 31, 1997 & JP 08 298654 A (Kyocera Corp), Nov. 12, 1996.
Patent Abstracts of Japan vol. 1997, No. 3, Mar. 31, 1997 & JP 08 297540 A (Fujitsu General Ltd), Nov. 12, 1996.
Patent Abstracts of Japan vol. 1995, No. 11, Dec. 26, 1995 & JP 07 219499 A (Hitachi Ltd), Aug. 18, 1995.
Patent Abstracts of Japan vol. 1999, No. 12, Oct. 29, 1999 & JP 11 194870 A (Mitsubishi Electric Corp), Jul. 21, 1999.

\* cited by examiner

*Primary Examiner*—Boris Pesin
(74) *Attorney, Agent, or Firm*—Frommer Lawrence & Haug LLP; William S. Frommer; Thomas F. Presson

(57) ABSTRACT

Users at a terminal are able to select network data using multiple, independently operated, cursors. These cursors include pointing devices, such as a mouse, a data tablet or other mechanism that selects data displayed on a terminal interface device. Decision logic may be used to determine which user has priority access when selected network content is desired by more than one user. This decision logic may be based on a user identity, terminal location, number of users at a terminal or other factors.

15 Claims, 18 Drawing Sheets

FIG.6
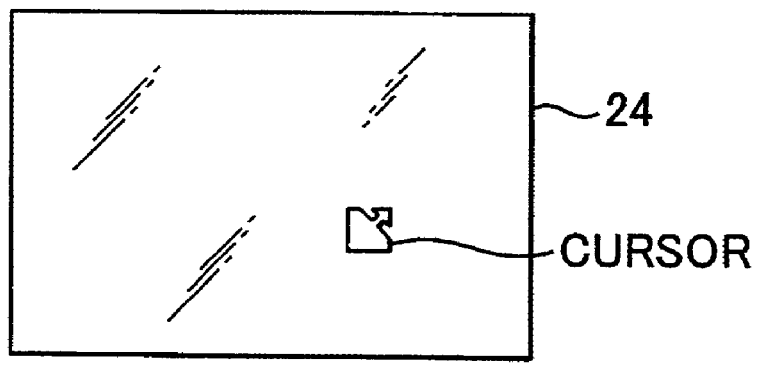
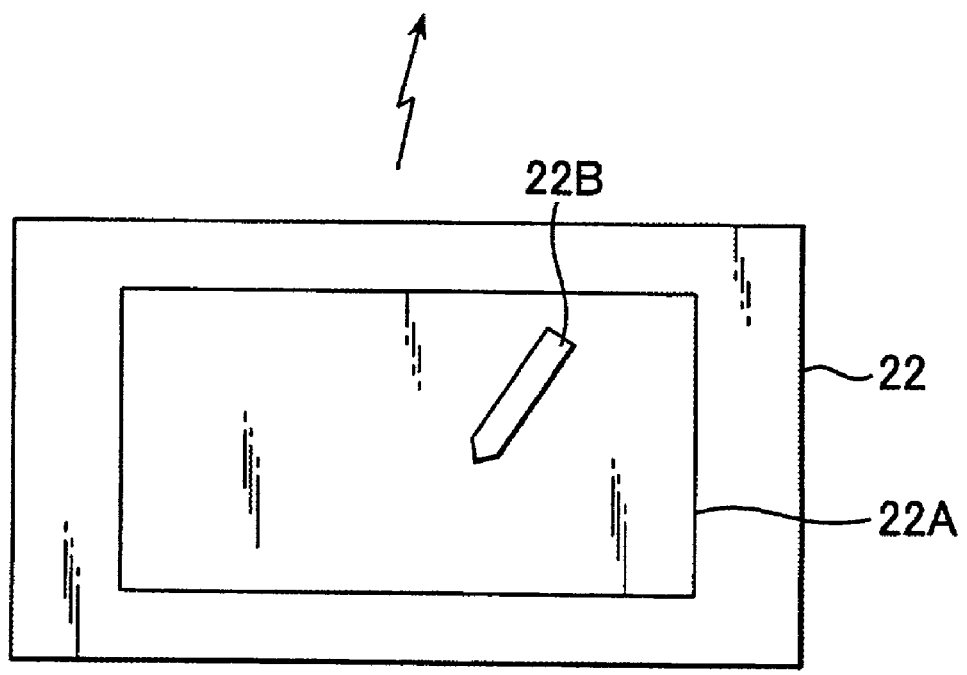

FIG.21
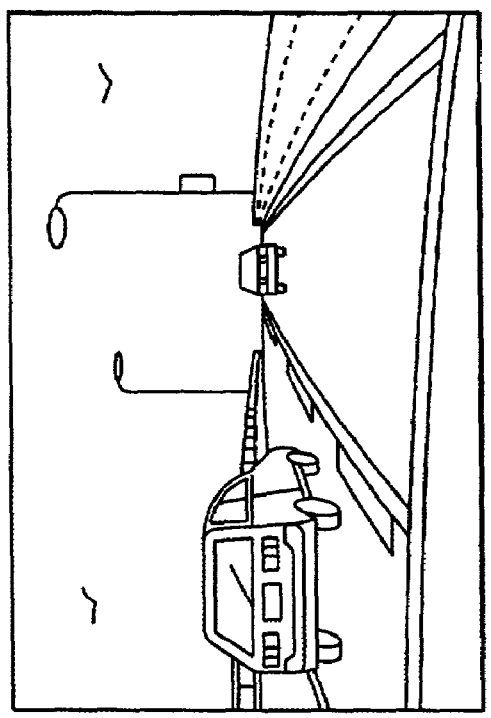
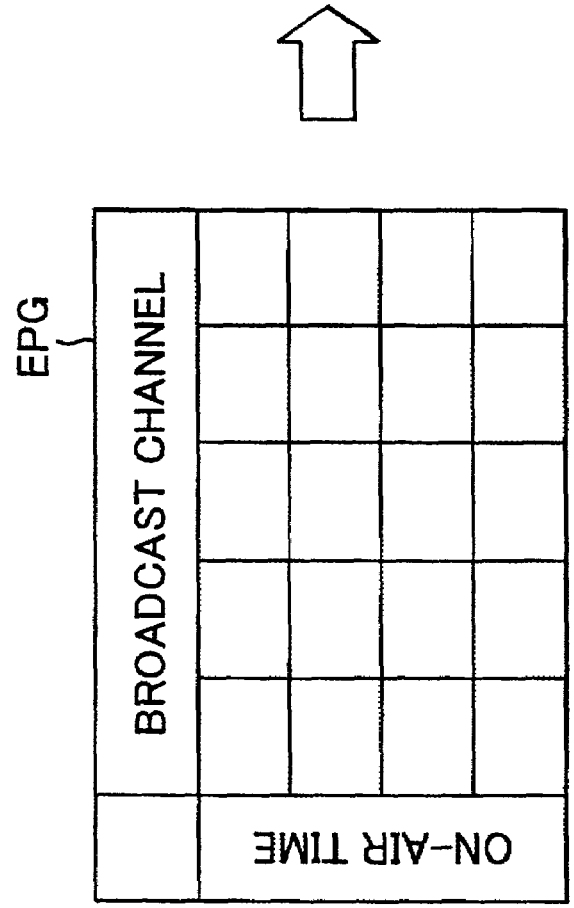

SYSTEM AND METHOD FOR ACCESSING DATA USING A PLURALITY OF INDEPENDENT POINTING DEVICES

BACKGROUND OF THE INVENTION

1. Field of the Invention

This invention relates to a display control apparatus and a display control method and recording medium on which a computer program for executing a program software for such display control method is recorded. Particularly this invention relates to a display control apparatus and method, in which a plurality of cursors independently operated by each user are displayed on a display by superposing on a web page, and each user can select a new web page to be accessed next by operating each cursor.

2. Description of the Related Art

For example, a WWW (World Wide Web) is established on an Internet, and any user can browse all kinds of web pages which are offered by a huge number of WWW servers using WWW browsing software.

Generally a so-called web page is described with an HTML (Hyper Text Mark up Language) and is able to have many link parts linking to all kinds of information such as other web page and image data, audio data and the like. In the WWW browser, link parts linked to other web pages are displayed with different color and different type font from other parts on the web page. Besides, a cursor placed on the link part is displayed with a different shape, and thereby a user can recognize that the link part is linked to other information.

An user operates a mouse to move a cursor on the link part, and clicks a left button of the mouse, then the WWW browser acquires new information linked to the link part from a WWW server, and the new information is displayed on a display. Namely at the link part, location information referred to as a URL (Uniform Resource Locator) to designate a location of the information on the Internet is described, and the WWW browser acquires the information specified by the URL, and displays thus acquired information.

As described above, a user operates the mouse to browse web pages transmitted from the WWW browser, and is able to select one of the web pages to be accessed next by clicking a corresponding link part.

Accordingly when browsing a web page with a plurality of users such as family or friends, one of these plural users operates the mouse as a representative.

However, when browsing a web page with the plurality of users, it is convenient if each user can operate each cursor and can select a desired web page. And if there is disagreement as to the selection of a web page among users, a web page to be accessed next is preferably decided by some adjustment such as a majority decision. Sharing of information by the plurality of users is very convenient.

In the above case, the plurality of users at the same location use a single display, but the sharing of information as described above can be applied to such a case where a plurality of users use a plurality of displays at different locations.

As a case where a plurality of users share information and individually operate an input device to control a character image as a cursor, is a television game machine, but at the television game machine, operation for each character image is done in the shared environment, but selection of a web page based on selection inputs by a plurality of users is not done.

In addition, there is a system in which shared information shared by a plurality of users is displayed on a plurality of displays. Such a system is, for example, a television conference system, a dispersion cooperation system which executes cooperation activities on a virtual space defined independently at each of a plurality of displays, or the like.

However, the television conference system makes all the participants share a common conference ground and the distributed cooperation system sums up work results by the plurality of users at the shared virtual space, and information to be accessed next is not determined in accordance with the selection input by the plurality of users.

SUMMARY OF THE INVENTION

According to the present invention, a plurality of cursors operated by each of a plurality of users and acquired information are simultaneously displayed on a display, and new information to be accessed next is selected based on operation of the plurality of cursors, and then acquired new information is displayed on the display.

Namely a display control apparatus for controlling display of information of the present invention comprises: a display control means for displaying information linked to more than one other information and a plurality of cursors on a display device; a selecting means for selecting one of the more than one other information based on each position designated by each of the cursors on the information displayed on the display device; and an acquisition means for acquiring the information selected by the selecting means.

In the display control apparatus, further a second memory means for storing all of the plurality of cursors stored in a plurality of first memory means is provided. In this case, the display control means operates to display the plurality of cursors stored in the second memory means on a display by superposing on the information.

The selecting means can select one of more than one other information based on each position of the cursors stored in the second memory means.

The display control apparatus of this invention, further comprises a first writing means for writing each cursor into a corresponding first memory means based on an operation signal from respective operating means for operating the cursors, and a second writing means for writing all of the plurality of cursors stored in the plurality of first memory means to the second memory means.

The method for controlling display of information of the present invention, the method comprises the steps of: a cursor information acquiring step for acquiring, from each of a plurality of terminal devices, stored contents of a first memory means storing more than one cursor operated at each of the terminal devices; a storing step for storing all the stored contents of the first memory means of the each terminal device in a second memory means for storing; a cursor information proposal step for proposing the stored contents of the second memory means to the respective terminal device to display the plural cursors corresponding to the stored contents of the second memory means at each of the terminal devices; a selecting step for selecting one of more than one other information linked to the information based on each position designated by each of the cursors on the information displayed together with the plural cursors at each of said terminal devices; and an acquisition control step for having each of the terminal devices acquire the information selected by the selecting means.

A recording medium of the present invention is recorded a computer program for executing computer processing which comprises the steps of: a storing step for storing a plurality of cursors in a plurality of memory means; a display control step for displaying all of said cursors stored in said memory means and information linked to more than one other information on a display; a selecting step for selecting one of said more than one other information linked to the information based on position on said information designated by each of said plural cursors displayed on said display; and an acquisition step for acquiring the information selected at said selecting step.

In the display control apparatus, the display control method and the recording medium recorded a computer software for executing such display control method, plural cursors are respectively stored and thus stored all cursors and the information linked to more than one other information are displayed on a display. And one of more than one other information linked to the information displayed on the display is selected based on position designated by each of the plural cursors, and thus selected information is displayed on the display.

BRIEF DESCRIPTION OF THE DRAWINGS

In the accompanying drawings:

FIG. 6 is a construction example of a remote controller 22 of FIG. 5;

FIG. 21 is a chart showing status in which a display screen is changed from an EPG image to a broadcast program.

DETAILED DESCRIPTION OF THE INVENTION

Figure 1:
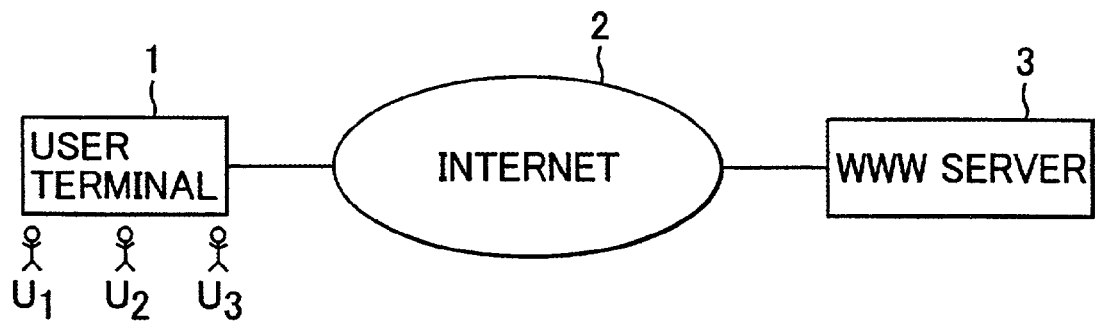
FIG. 1 is a construction example of a first embodiment of an information system to which the present invention is applied.

FIG. 1 shows a construction example of a first embodiment of an information processing system to which this invention is applied. A term "system" used in this specification means a thing which is directed to an object including more than one apparatus gathered logically, and the object does not need to include more than one such apparatus in a same case.

An user terminal 1 is connected to the Internet 2 and the user terminal 1 has a function of a WWW (World Wide Web) browser. Accordingly, in the information processing system of FIG. 1, the user terminal 1 can receive a proposal of web pages from a WWW server 3 through the Internet 2.

For simplification of the description in this specification, only one WWW server 3 is depicted in FIG. 1, FIG. 10, FIG. 18 and FIG. 19. However, plenty of WWW servers exist in the real Internet 2 as well known.

The web page offered by the WWW server 3 is described, for example, with a computer language called HTML (Hyper Text Markup Language), and all kinds of information such as audio data, image data and other web pages are usually linked to this web page.

Figure 2:
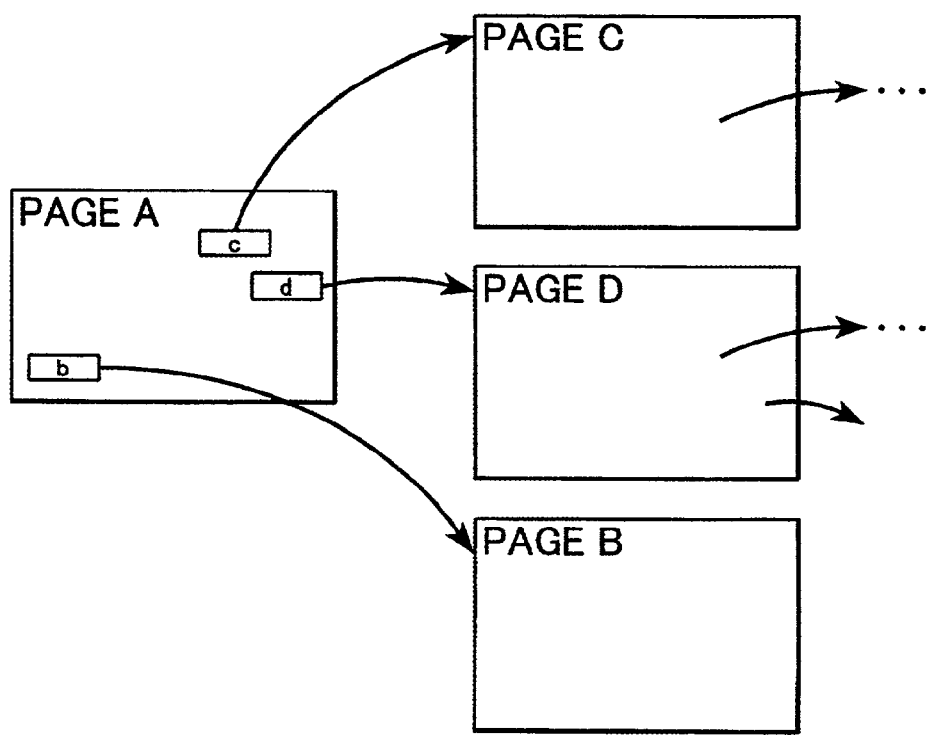
FIG. 2 is a chart showing status of links on a display.

FIG. 2 shows a linking condition of these links on a web page A, where link parts b, c and d displayed on the web page A are linked to the other web pages B, C, D. In this case, such link parts are favorably displayed with different color and different type font from the other part on the web page A. Or underlines are added to the type font or such link part is surrounded with a frame in order to be recognized by a user. A cursor moved to such link part is displayed with another different shape from a shape at another part of the web page A. To be more concrete, if the text data is displayed with mainly an Italic typeface on the web page A, for example, the text data is displayed with a Gothic typeface at the link part and if the cursor is displayed basically with an arrow shape, for example, the cursor is displayed with a finger shape at the link part of the web page A.

When a user clicks such a link using a mouse or another pointing device for controlling the cursor, then the user terminal 1 as a WWW browser transmits a URL (Uniform Resource Locator) address of another web page linked to the link part to the Internet 2. Thereby the user terminal 1 requests the web page corresponding to the transmitted URL to the corresponding WWW server 3 which has data for the web page data of the transmitted URL. Then the WWW server 3 transmits the corresponding HTML file of the requested web page to the user terminal 1 through the Internet 2, and the user terminal 1 as the WWW browser interprets the HTML file corresponding to the web page and displays the requested web page.

In the embodiment of FIG. 2, the link parts b, c and d on the web page A are respectively linked to the web pages B, C and D, and accordingly when the cursor is moved on the link part b, c or d, then a left button of the mouse is clicked at the user terminal 1, then the web page B, C or D is displayed on a display of the user terminal 1.

Generally in this specification, a web page is expressed using an upper case of the alphabet (capital letter), and a link part is expressed using a lower case (normal letter) of the alphabet.

Figure 3:
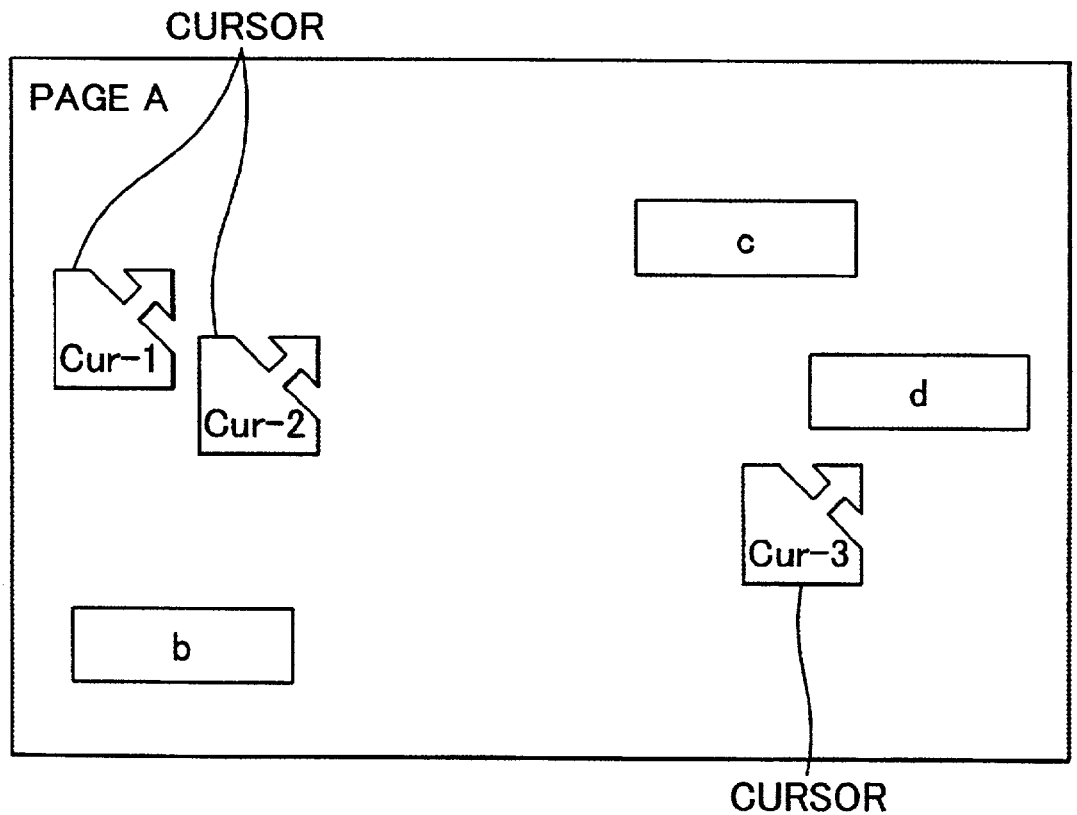
FIG. 3 is a chart showing more than one cursor superposed on a web page on a display.

Returning to FIG. 1, a plurality of users can handle and execute each user's cursor independently and simultaneously at the user terminal 1. In the embodiment of FIG. 1, three users U1, U2 and U3 exist, therefore independently controllable three cursors Cur-1, Cur-2 and Cur-3 are displayed on the web page A as shown in FIG. 3, and each user U1, U2 or U3 of the user terminal 1 can control their corresponding own cursor on the web page A.

The plurality of cursors are respectively displayed so as to be distinguished to each other corresponding to each operating user U1, U2 or U3. Further each cursor is displayed with different color and different shape, or with each name of the respective user. Alternatively a character image (face image, for example) of each user can be used as a shape of the cursor by registering such user's image in advance.

As described above, the respective cursor Cur-1, Cur-2 or Cur-3 is controlled independently by each user U1, U2 or U3, so that two or three different link parts are simultaneously designated and clicked sometimes. In this case, the user terminal 1 has to determine a particular web page to be accessed next by a majority decision, for example. Namely the user terminal 1 selects the web page appointed and clicked by the maximum number of cursors, and requests the WWW server 3 having the corresponding web page to display.

Figure 4A:
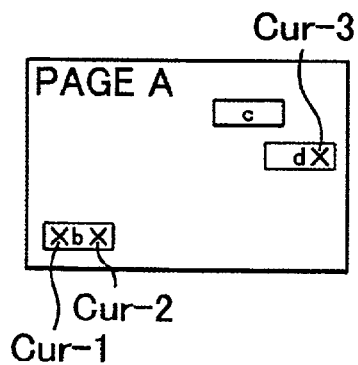
FIGS. 4A to 4C are charts for explaining a selecting method of a web page to be accessed next.
Figure 4B:
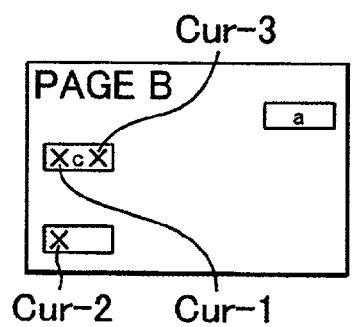

Accordingly suppose the user U1 moves the cursor Cur-1 to the link part b and clicks, the user U2 moves the cursor Cur-2 to the link part b and clicks and the user U3 moves the cursor Cur-3 to the link part d when the web page A is displayed in the user terminal 1 as shown in FIG. 4A. Then the user terminal 1 selects the link part b appointed by the maximum number of cursors and requests the web page B corresponding to the link part b to the WWW server 3 that has data for the web page B. As shown in FIG. 4B, the web page B transmitted from the WWW server 3 is then displayed. Accordingly in this case the request of the user U1 and the user U2 are accepted.

Figure 4C:
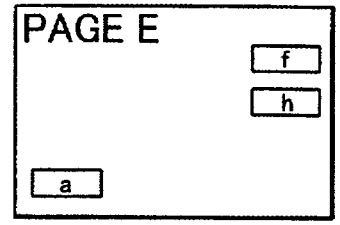

In FIG. 4B, the web page B has a link part a linked to the web page A, a link part e linked to the web page E and a link part f linked to the web page F. When such web page B is displayed as shown in FIG. 4B, suppose the user U1 moves the cursor Cur-1 to the link part e and clicks, the user U2 moves the cursor Cur-2 to the link part f and clicks and the user U3 moves the cursor Cur-3 to the link part e and clicks. Then the user terminal 1 selects the link part e appointed by the maximum number of cursors and requests the web page E corresponding to the link part e to the WWW server 3 that has data for the web page E. As shown in FIG. 4C, the web page E transmitted from the WWW server 3 is then displayed. Accordingly in this case the requests of the user U1 and the user U3 are accepted.

As described above, the user terminal 1 displays more than one cursor operated by each of a plurality of users and the web page, and selects a particular web page determined by the operations of these cursors to display. In the above case, only the web page selected by the maximum number of users using the majority decision is displayed at the user terminal 1, but it is possible to display the other web page selected by another user within a small window like a picture-in-picture function.

Figure 5:
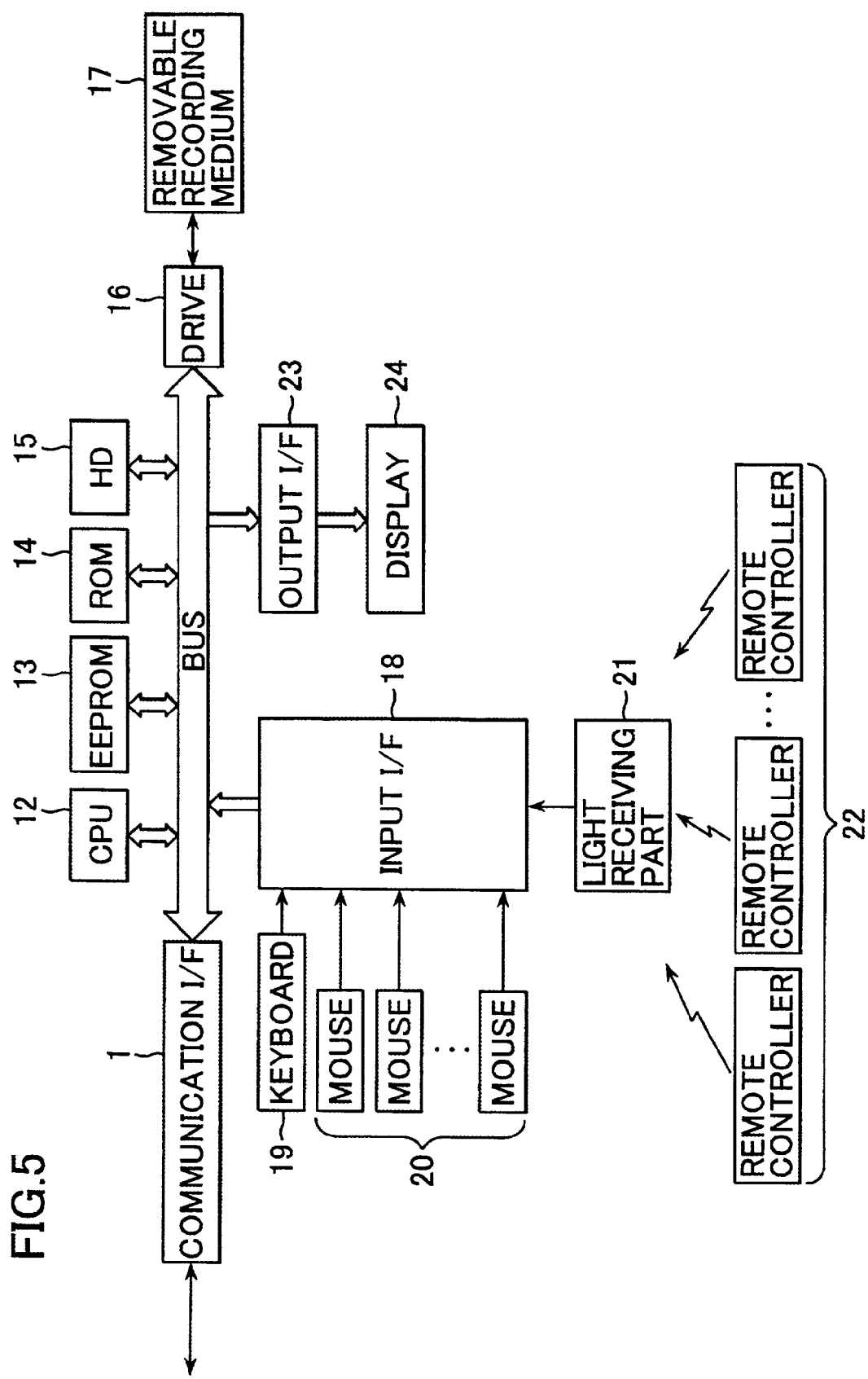
FIG. 5 is a block diagram showing a hardware organization example of a user terminal 1.

FIG. 5 shows a constructive example of the user terminal 1 in FIG. 1. In an embodiment of FIG. 5, the user terminal 1 may be a personal computer, for example. Further in FIG. 5, a communication I/F (Inter-Face) 11 comprises a MODEM (Modulator-Demodulator), a TA (Terminal Adapter), a DSU (Digital Service Unit), an NIC (Network Interface Card) and or a tuner, and executes a communication control through the Internet 2 and or another network. Namely the communication I/F 11 receives data from the Internet 2 or the like and outputs to a bus, and further transmits the data on the bus to the Internet 2 or the like.

A CPU (Central Processing Unit) 12 executes a program of a BIOS (Basic Input Output System) stored in an EEPROM (Electrically Erasable Programmable Read-only Memory) 13 and further the CPU 12 executes a program for an OS (Operating System) stored in a HD (Hard Disk) 15 by loading the OS into a RAM (Random Access Memory) 14 through the bus. Further the CPU 12 reads out an application program stored in the HD 15 or reads out an application program stored in a removable recording medium 17 through a drive 16 under the control of the BIOS and the OS, and executes the read out application program by loading into the RAM 14. Accordingly the CPU 12 operates the user terminal 1 as a WWW browser and executes various processing as will be mentioned later.

For example, the EEPROM 13 stores the program of the BIOS. And as a means for storing the program for the BIOS, a non-rewritable ROM can be used instead of the EEPROM 13, but in this embodiment the EEPROM 13 is employed to store the BIOS in order to be able to execute a version up processing of the BIOS.

The RAM 14 temporarily stores the programs and the data necessary for the operation of the CPU 12. The HD 15 stores the OS program, the application programs and other programs to be executed by the CPU 12, and further the HD 15 temporarily stores the data necessary for the operation of the CPU 12.

The drive 16 executes the read/write operation for the program and the data to/from the removable recording medium 17 under the control of the CPU 12. The removable recording medium 17 comprises a floppy disc, a CD-ROM (Compact Disc Read Only Memory), a MO (Magneto Optical) disc, a DVD (Digital Versatile Disc), a magnetic disc or a semiconductor memory, and the OS programs, the application programs and other necessary programs to be executed by the CPU 12 are stored in this removable recording medium 17. Further the data obtained by executing the processing by the CPU 12 are also stored in the removable recording medium 17.

An input I/F 18 receives operation signals from an external device in accordance with the various operations of the users, and supplies the operation signals to the CPU 12 through the bus. In the embodiment in FIG. 5, a keyboard 19, a mouse 20 and a light receiving part 21 are connected to the input I/F 18. In this embodiment, when the keyboard 19 is operated by the user, the operation signal corresponding to an operated key is supplied to the input I/F 18. Further when the mouse 20 is operated by the user, the operation signal corresponding to a mouse operation is supplied to the input I/F 18. The light receiving part 21 receives an operation signal of an infra-red light corresponding to an operation of a remote commander 22 and supplies the operation signal to the in input I/F 18 after converting the operation signal of the infra-red light into an electric signal.

In the embodiment of FIG. 5, a plurality of mice 20 can be connected to the user terminal 1 and the plurality of cursors can be independently controlled by operating the respective mouse 20. Accordingly a plurality of connecting terminals for connecting more than one mouse 20 are provided at the user terminal 1 and a conventional BIOS program is revised in order to realize the connection of more than one mouse 20 and handling the operation of each mouse 20 independently.

In addition, in the embodiment of FIG. 5, the light receiving part 21 can accept the operation signal from more than one remote controller 22, and the plural cursors can be controlled by operating each remote controller 22 independently. Such independent control of the cursors by respective remote controller 22 can also be achieved by improving the conventional BIOS program. An output I/F 23 receives image data supplied through the bus, and supplies the image data to a display 24.

The display 24 comprises a CRT (Cathode Ray Tube) or a liquid crystal display panel, and displays an image of the image data from the output I/F 23. Further as shown in FIG. 5, the communication I/F 11, the CPU 12, the EEPROM 13, the RAM 14, the HD 15, the drive 16, the input I/F 18 and the output I/F 23 are mutually connected by way of the bus.

In addition, the programs for the CPU 12 to execute various processing are stored in the HD 15 installed in the personal computer as the user terminal 1 in advance. These programs can be stored in the removable recording medium 17 temporarily or permanently and the recorded removable recording medium 17 can be offered as a so-called package software.

Further, such programs are installed in the user terminal 1 from the removable recording medium 17 and in addition, such programs can be transmitted by radio transmission from a download site through a digital broadcast satellite, or transmitted by a cable through a LAN (Local Area Network), the Internet 2 or another network to the user terminal 1, wherein the transmitted programs are received through the communication I/F 11 and are installed in the internal HD 15.

In the user terminal 1 constructed as above, the program installed in the HD 15 or the like is loaded in the RAM 14 and executed by the CPU 12, by which the web page is requested that corresponds to the WWW server 3 through the Internet 2 by the communication I/F 11 of the user terminal 1. Then according to this request, the web page transmitted from the WWW server 3 through the Internet 2 is received at the communication I/F 11 and is displayed through the output I/F 23 on the display 24. In addition to the web page, the CPU 12 displays the plural cursors on the display 24, wherein the number of displayed cursors corresponds to the number of mouse devices 20 that are connected to the input I/F 18 or to the number of remote controllers 22.

The cursor is operated by the remote controller 22 as follows. The remote controller 22 comprises a data tablet having a pad 22A and a pen 22B as shown in FIG. 6, and the cursor displayed on the display 24 is moved by moving the pen 22B on the pad 22A. And at the remote controller 22, the operating signal including the information representing a position pointed by the pen 22B on the pad 22A is transmitted to the light receiving part 21. The light receiving part 21 then receives this operation signal and supplies this signal to the CPU 12 through the input I/F 18. The CPU 12 accordingly moves the cursor displayed on the display 24 in accordance with the thus supplied operation signal. In this case, the operation means to operate the cursor is not limited to the mouse 20 and the data tablet, and a track pad, a track ball or other pointing device can be used in addition to above as a pointing device.

In the user terminal 1, more than one cursor operated independently by more than one remote controller 22 is displayed on the display 24 by superposing on the web page. This is done, for example, as follows.

Namely the CPU 12 allocates on the RAM 14 a storage area corresponding to a display screen of the display 24 in accordance with a number corresponding to the number of the remote controller 22 in use, namely the number corresponding to the number of cursors operated by the remote controller 22 in use. Here the storage area thus allocated corresponding to the respective cursor is called as a position representation layer. Further each position representation layer corresponding to the plural cursors Cur-1, Cur-2 and Cur-n are expressed as Pos-1, Pos-2 and Pos-n.

Further, the CPU 12 allocates on the RAM 14 corresponding to the screen of the display 24 one storage area for bringing together the stored information on the position representation layer. Herein such storage area allocated by one at the user terminal 1 is referred to as an all position representing area All.

Figure 7A:
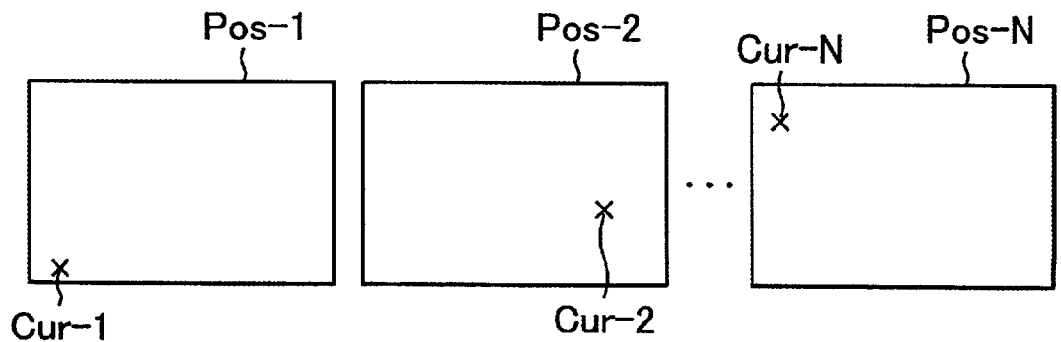
FIGS. 7A to 7C are charts for explaining a method for displaying more than one cursor on a web page.

The CPU 12 writes the cursors Cur-1, Cur-2, . . . Cur-n independently operated by the plural remote controllers 22 in the position representation layers Pos-1, Pos-2, . . . Pos-n as shown in FIG. 7A. Namely the CPU 12 recognizes the position of the cursor Cur-n (n=1,2, . . . , N) based on the operation signal from the remote controller 22, then the CPU 12 writes the image data of the cursor Cur-n at a corresponding location of the position representation layer Pos-n.

Figure 7B:
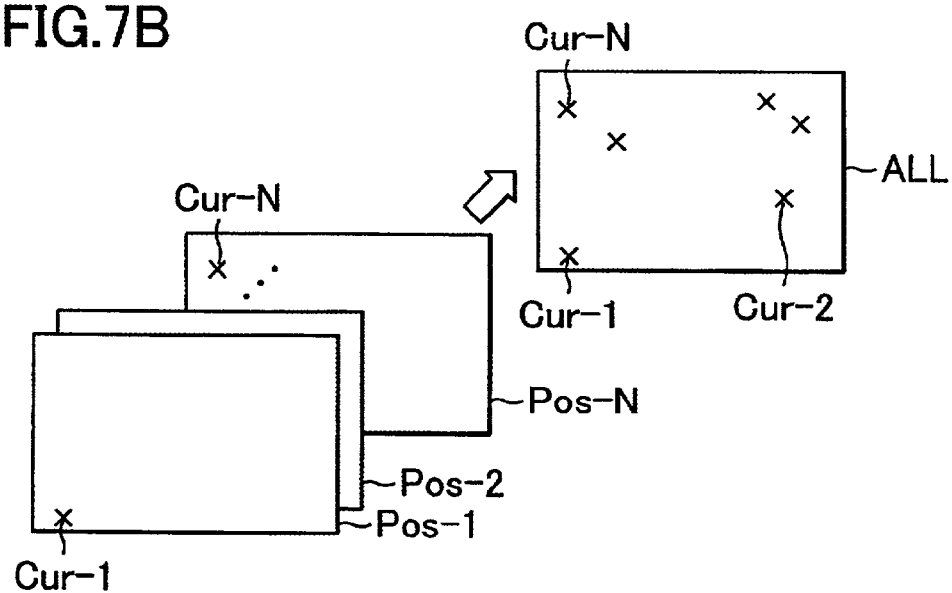
Figure 7C:
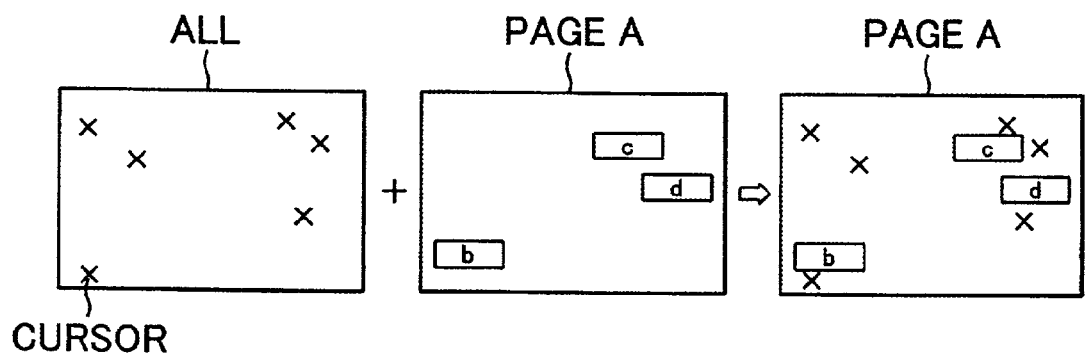

Further the CPU 12 copies the cursors Cur-1 to Cur-N of the position representation layers Pos-1 to Pos-N to the all position representation layer All as shown in FIG. 7B. Thereby the image data of all the cursors Cur-1, Cur-2 . . . . Cur-N independently operated by the respective remote controller 22 are written in the all position representation layer All. Then the CPU 12 superposes the cursors Cur-1 to Cur-N of the all position representation layer All on the web page A, for example, received to display through the Internet 2 and displays on the display 24 as shown in FIG. 7C. Accordingly the plural cursors independently operated by the respective remote controller 22 are displayed on the web page A at the user terminal 1 with superposing on the web page A.

A method for displaying more than one cursor is not limited to the method as described above. The user terminal 1 displays more than one cursor operated by the users and the web page, and further displays a linked web page based on the operation of the plurality of cursors, in which an input processing for processing input operation of the plurality of cursors and display control processing for controlling the display of the plurality of cursors superposed on the web page are executed by the CPU 12.

At first, the input processing is explained with reference to a flowchart in FIG. 8. In this case, the input processing is done independently by more than one remote controller 22 while displaying more than one cursor. In this input processing, the CPU 12 judges whether the remote controller 22 is operated to move cursor Cur-n, and when the remote controller 22 is not operated, then the CPU 12 moves the processing to step S5 by skipping from step S2 to step S5.

In addition in step S1, the CPU 12 moves the processing to step S2 when an operation for moving the cursor Cur-n is judged, or namely when the CPU 12 receives the operation signal including information representing the position of the cursor Cur-n from the remote controller 22. Then the CPU 12 converts the information representing position of the cursor Cur-n to the coordinate on the display screen of the display 24, wherein such information is included in the operation signal. Namely the information for representing the position of the cursor Cur-n included in the operation signal from the remote controller 22 is a coordinate on the pad 22A contacted by the pen 22B as shown in FIG. 6 and the CPU 12 converts the coordinate on this pad 22A into the coordinate on the display screen of the display 24.

Further, the CPU 12 moves the processing to step S3, writes the image data of the cursor Cur-n to a position corresponding to the coordinate of the position representation layer Pos-n (FIG. 7A) obtained at step S2, and then moves the processing to step S4. The CPU 12 copies the cursor Cur-n of the position representation layer Pos-n on the all position representation layer All (FIG. 7B), and moves the processing to step S5.

Figure 8:
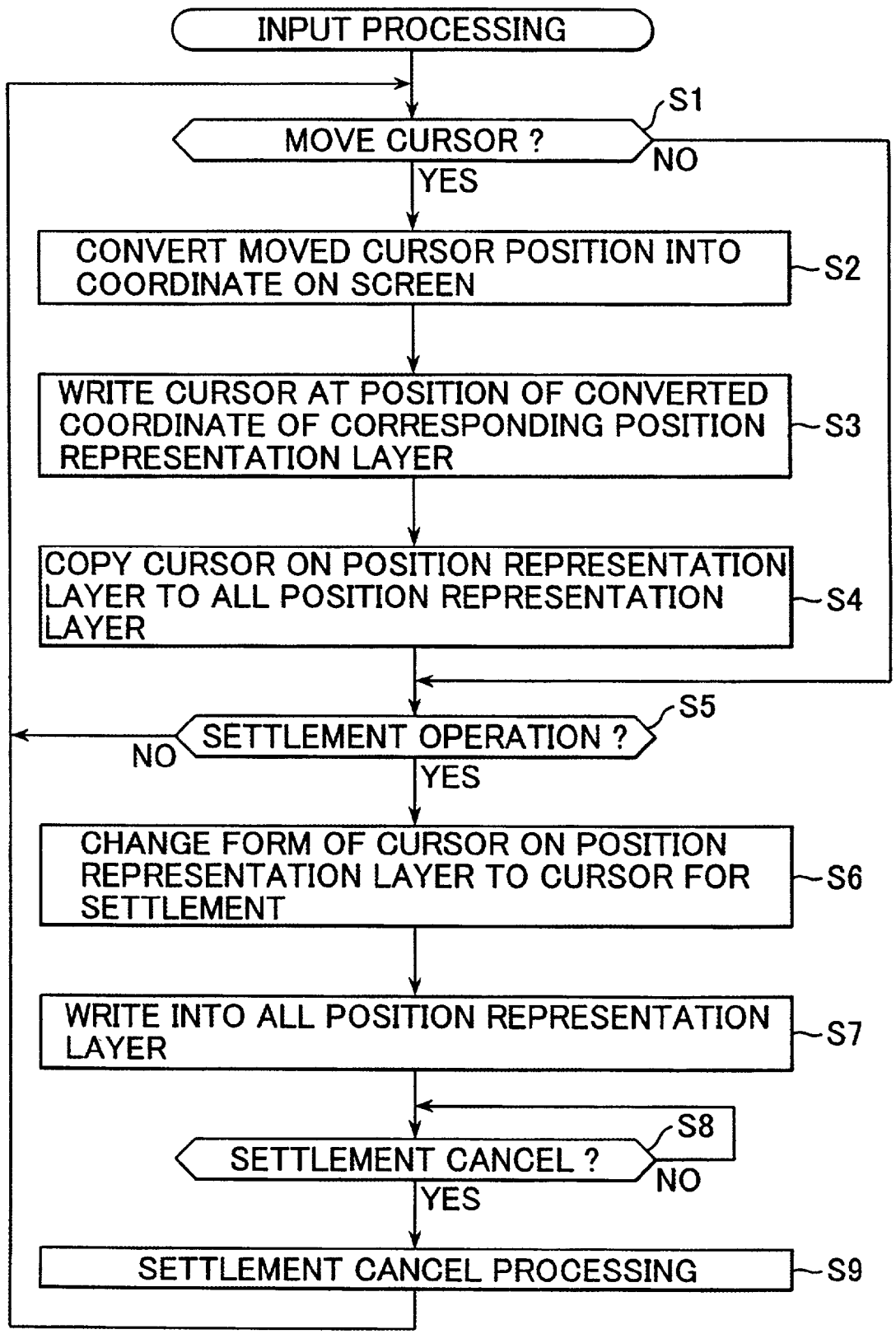
FIG. 8 is a flowchart for explaining an input processing.

The input processing in FIG. 8 is done independently regarding more than one cursor Cur-1 to Cur-N, so that the image data of the respective cursor Cur-1 to Cur-N is written at a position of the all position representation layer All corresponding to the operation of more than one remote controller 22. Accordingly all the cursors Cur-1 to Cur-N on the all position representation layer All are displayed on the display 24 by superposing these cursors Cur-1 to Cur-N operated by respective user on the web page.

In step S5, the CPU 12 judges whether a settlement operation for settling the position of the cursor Cur-n in operation is done by the remote controller 22, and if not, then the CPU 12 returns the processing to step S1 to repeat the processing. The cursor Cur-n of the position representation layer Pos-n is rewritten according to the operation of the remote controller 22 by repeating the processing of step S1 to S5. Thereby the cursor Cur-n on the all position representation layer All is also rewritten, and as a result, the cursor Cur-n displayed on the display 24 moves in response to the operation of the remote controller 22.

On the other hand at step S5, when it is judged that the remote controller 22 corresponding to the cursor Cur-n is operated for the settlement, namely if the user operates the remote controller 22 to settle in order to select a link part on the web page displayed on the display 24 when the cursor Cur-n is placed on the link part, the processing moves to step S6. Such settlement operation is something like a click operation by a mouse and is done by pressing the pad 22A with the pen 22B as shown in FIG. 6 with a proper pressure. Then the CPU 12 changes the image of the cursor Cur-n at the position representation layer Pos-n from the normal image data to the position settled image data.

In this embodiment, more than one user is able to operate the respective cursor, so that the position settled cursor is displayed with a different shape or different color from the other cursor before position settlement in order for the user to recognize the position settlement of the other cursor operated by the other user. And then the processing moves to step S7, and the CPU 12 copies the cursor Cur-n of the position representation layer Pos-n to the all position representation layer All. Accordingly in step S7, the image data for expressing the position settlement of the cursor Cur-n is written into the all position representation layer All, and as a result, the position settled cursor Cur-n is displayed on the display 24 with different shape and color from those of the cursor before the position settlement. The image data for the cursor Cur-n of before position settlement is called a normal image data in this explanation.

Figure 9:
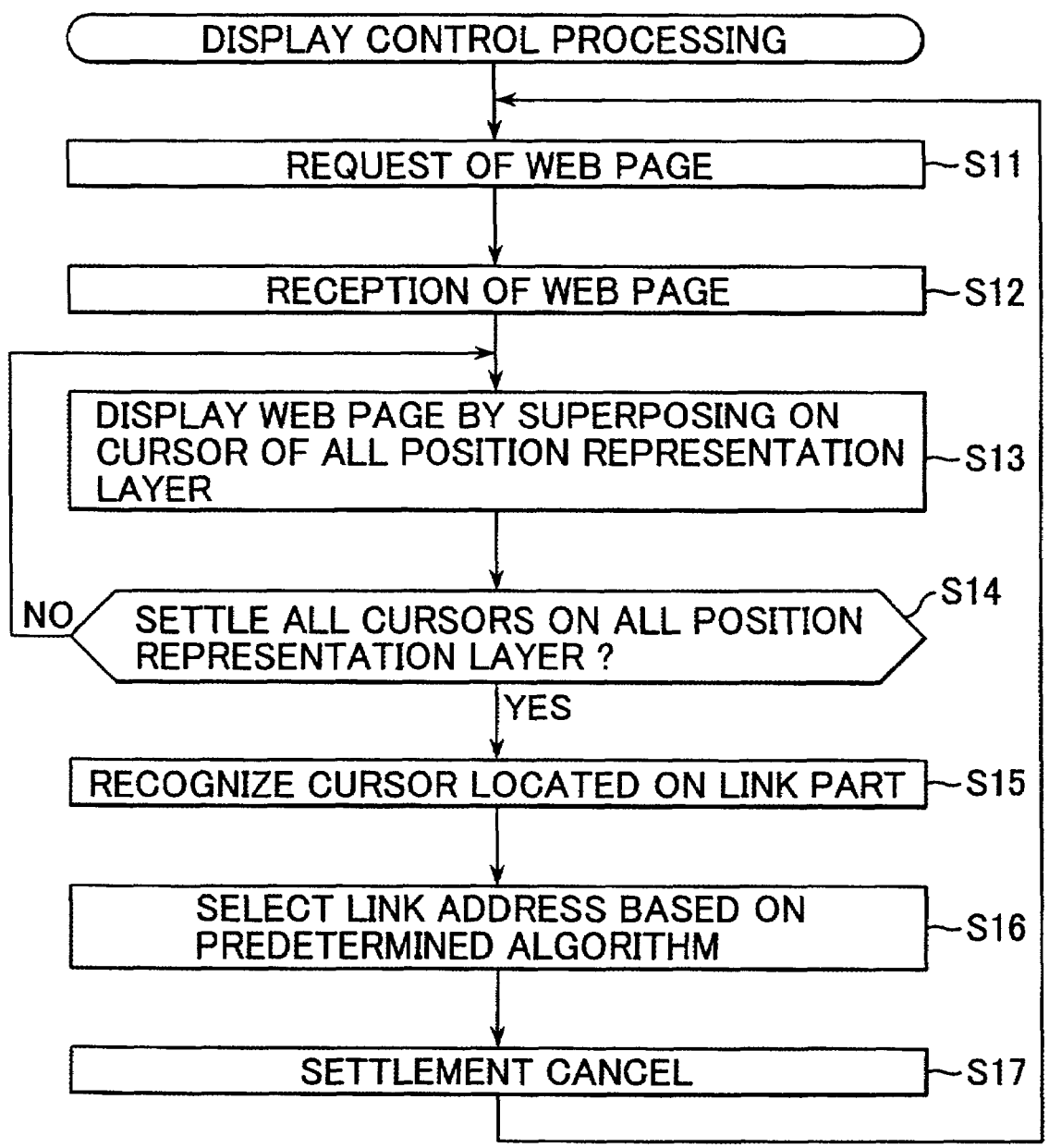
FIG. 9 is a flowchart for explaining a display control processing.

After that, the processing moves to step S8, the CPU 12 judges whether a request of canceling the position settlement for the cursor Cur-n is done in the display control processing in FIG. 9. If it is judged that the request for canceling the position settlement is not done, the processing returns to step S8 and the similar processing is repeated.

Accordingly for the cursor Cur-n, the image data for the position settlement is kept written in the position representation layer Pos-n after the position of the cursor Cur-n is settled, and further the image data for the position settlement is kept written in the all position representation layer All, so that until the position settlement is canceled, the cursor Cur-n is kept displayed on the display 24 with the image for the position settlement at a position where the position settlement is done in spite of the operation of the remote controller 22.

And when it is judged that the request of the settlement cancel is done in step S8, the processing moves to step S9 and then the CPU 12 executes the settlement cancel processing. Namely the CPU 12 rewrites the image data for the position settlement of the cursor Cur-n in the position representation layer Pos-n to the normal image data, then moves the processing to step S1 and the similar processing is repeated. Accordingly if there is a request for the settlement canceling, the cursor Cur-n is able to be controlled again according to the operation of the remote controller 22. In the case as above described, the settlement cancel processing is done when the request for the settlement cancel is issued, but such settlement cancel processing can be done when the user operates a predetermined operation to the remote controller 22.

A display control processing is explained next with reference to a flowchart in FIG. 9. At first in the display control processing, the request for the web page corresponding to the URL is done by the communication I/F 11 when being recognized at step S11, wherein the URL is to be entered by the user or the URL is previously preset. This request is received by the corresponding WWW server 3 through the Internet 2 and the corresponding WWW server 3 transmits the corresponding web page (as an HTML file) to the user terminal 1 that requests the web page through the Internet 2. The communication I/F 11 of the user terminal 1 receives the web page transmitted from the WWW server 3 at step S12 as described above and supplies it to the CPU 12. Then the CPU 12 superposes the all position representation layer All on the web page from the communication I/F 11, and supplies them to the display 24 through the output I/F 23 at step S13.

As described above, the input processing of FIG. 8 is done to the respective cursor Cur-1 to Cur-N independently, so that the image data of respective cursor Cur-1 to Cur-N is written at each position of the all position representation layer All corresponding to the operation of more than one remote controller 22. Accordingly, in step S13, the data obtained by superposing the all position representation layer All on the web page is supplied to the display 24, so that the web page and each of the user operating cursors Cur-1 to Cur-N are displayed on the display 24.

And the processing moves to step S14, and the CPU 12 judges whether positions of all cursors Cur-1 to Cur-N on the all position representation layer All are settled or not. In this case when all the positions of cursors Cur-1 to Cur-N are not settled, the processing moves back to step S13, and similar processing is repeated. On the other hand, if it is judged that the positions of all cursors Cur-1 to Cur-N on the all position representation layer All are settled, the processing moves to step S15. Then the CPU 12 recognizes the cursor positioned on the link part of the web page displayed together with the cursors Cur-1 to Cur-N on the display 24 at step S15.

Namely the CPU 12 recognizes the cursor position settled on each link part by comparing the coordinate of each link part of the web page on the display 24 with the coordinate of the location of the settled cursors Cur-1 to Cur-N. And the processing moves to step S16, then the CPU 12 selects a web page to be accessed next among web pages linked to each link part based on the recognition result of the position settled cursor at each link part in accordance with a predetermined algorithm.

Namely as described above, the CPU 12 recognizes the link part on which the maximum number of cursors are positioned and then selects the web page linked to the link part for accessing a next web page. After that the processing moves to step S17, then the CPU 12 demands the settlement cancel processing for the input processing of FIG. 8 done just before, and moves the processing back to step S11. In this case, the web page selected just before at step S16 is requested and then similar processing is repeated.

Accordingly in the user terminal 1, more than one user can browse the web page, and further, the respective user can enter the web page selecting operation of their own desire by operating the corresponding cursor. In this case when web pages to be accessed next conflict, one of web pages is conclusively decided by the majority decision, for example, and thus the selected web page is displayed after that. As a result, more than one user can join to the web page selecting operation with participation of all members while confirming each other's selecting operation.

In the above described explanation, a web page to be accessed next is decided by a simple majority decision, however, the selection of a web page to be accessed next can be decided by the majority decision weighted with priority of the cursors, wherein a priority of a respective cursor is assigned in advance. In this case, it is probable that a web page to be pointed by the cursor having high priority is easily selected as the web page to be accessed next.

In addition, when the priority is assigned to each cursor as described above, it is possible to fix the priority to the cursor, or on the contrary it may be possible to vary the priority assigned to the cursor. One method for varying the priority to the cursor is to vary the priority to the cursor in order, or to assign higher priority to the cursor of the user whose previous request was not accepted upon selecting the web page. Furthermore, the users who selected a different link part compete using a rock-paper-scissors game on the user terminal 1, and a web page to be accessed next is selected according to the result of the rock-paper-scissors game.

In the above described case, a web page to be accessed next is selected after the positions of all the cursors Cur-1 to Cur-N on the all position representation layer All are settled in the display control processing of FIG. 9, so that if one of the users does not settle the position of the cursor, a web page to be accessed next is not decided and the other users have to wait for a long time. In order to overcome this defect, it is possible to decide a next web page within a predetermined time after the first cursor is settled in its position. In this case, the selection of a next web page is decided based on only the position settled cursors at the moment.

Figure 10:
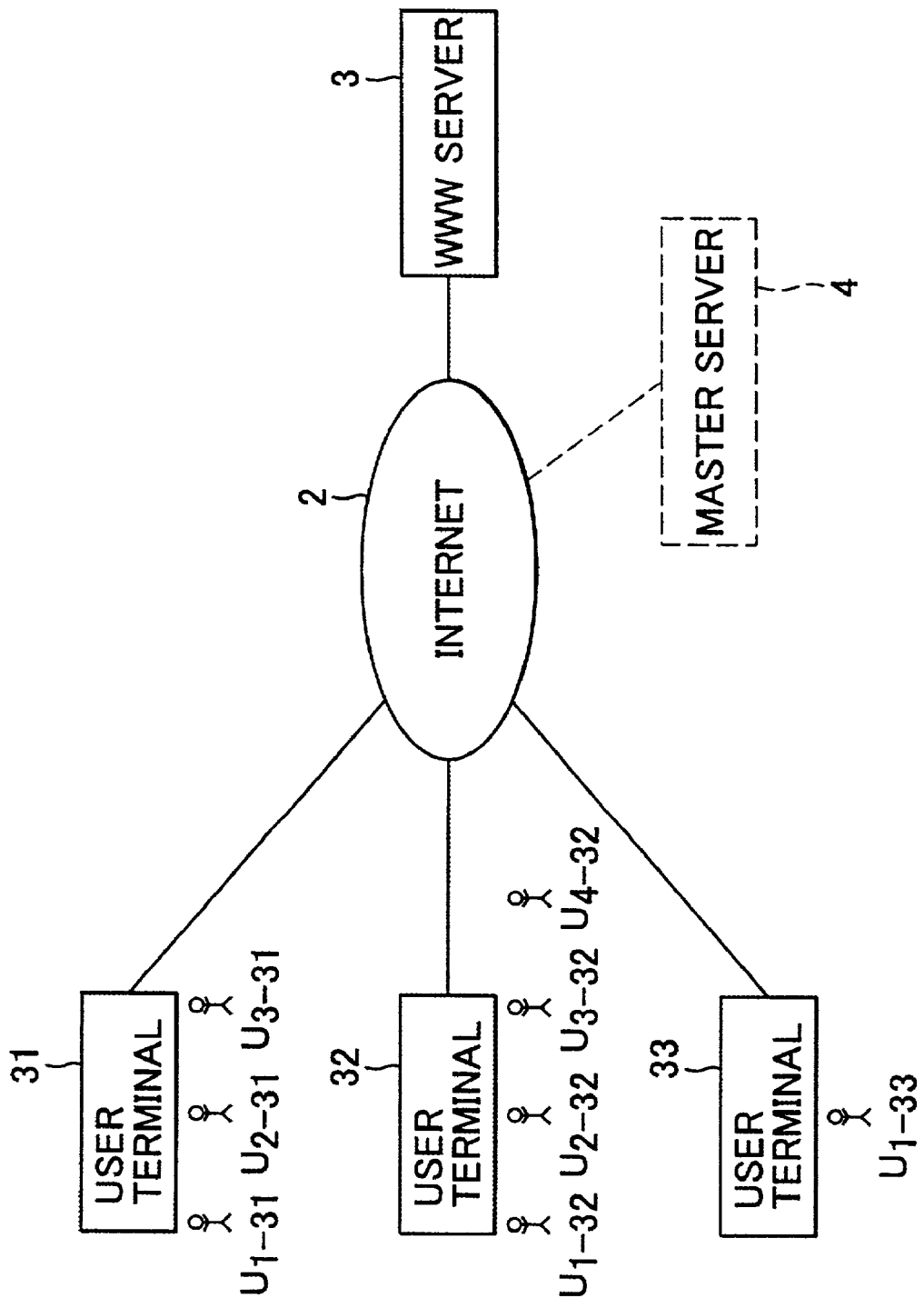
FIG. 10 is a construction example of a second embodiment of an information system to which the present invention is applied.

FIG. 10 shows a second embodiment of the information system of this invention. In the figure, portions corresponding portions in FIG. 1 are the same in FIG. 10 and the explanation to such portions is omitted here by using the same reference numerals. As for the information system of FIG. 10, three user terminals 31, 32 and 33 are arranged instead of the one user terminal 1 of FIG. 1, and the others are arranged in a manner similar to the information system in FIG. 1.

Each user terminal 31, 32, 33 is constituted same as the user terminal 1 of FIG. 1. Accordingly each user terminal 31, 32, 33 browses the same web page like the user terminal 1, and each user can select a web page to be accessed next independently by controlling the corresponding cursor. The user terminals 31 to 33 might be located at remote locations such as, for example, Japan, U.S.A. and China.

In the embodiment of FIG. 10, there are three users U1-31, U2-31 and U3-31 of the user terminal 31, there are four users U1-32, U2-32, U3-32 and U4-32 of the user terminal 32 and there is one user U1-33 of the user terminal 33. Each user terminal displays the same web page with eight cursors operated by the respective users U1-31, U2-31, U3-31 of the user terminal 31, the users U1-32, U2-32, U3-32, U4-32 of the user terminal 32 and the user U1-33 of the user terminal 33.

Further, when a web page to be accessed next selected by respective users U1-31, U2-31, U3-31 of the user terminal 31, users U1-32, U2-32, U3-32, U4-32 of the user terminal 32, and user U1-33 of the user terminal 33 conflicts, then a next web page is finally decided by the majority decision and the same web page is displayed at each user terminal 31, 32, 33 in the embodiment of FIG. 10. Accordingly all users can join to select a web page to be accessed next while watching the settlement operation of all the cursors operated by respective users, even if each user lives in a remote location.

When more than one user terminal exists, like a case in the embodiment of FIG. 10, this majority decision can be done using user unit basis or user terminal unit basis. Namely in FIG. 10, if the majority decision is done using user unit basis, a web page designated by the maximum number of users is selected among eight users U1-31, U2-31, U3-31, U1-32, U2-32, U3-32, U4-32 and U1-33 of the user terminals 31 to 33. In addition, if the majority decision is done using user terminal unit basis, a web page designated by the maximum number of users is temporarily selected at each of the user terminals 31, 32, 33. Then a web page selected by the maximum number of user terminals among temporarily selected web pages is finally selected as a web page to be selected next.

Suppose the user U1-31 of the user terminal 31 and three users U1-32, U2-32 and U3-32 of the user terminal 32, namely four users select the link part b, and 2 users U2-31 and U3-31 of the user terminal 31 and the user U1-33 of the user terminal 33, namely three users select the link part c. And further the user U4-32 of the user terminal 32 selects the link part d, when the web page A of FIG. 3 is displayed. Then in the case of the majority decision based on the user unit basis, the web page B linked to the link part b which the maximum number of users want to select is decided to be accessed next.

On the other hand, in a case of the majority decision based on the user terminal unit basis, one user U1-31 among three users U1-31 to U3-31 at the user terminal 31 selects the link part b in the user terminal 31 and two users U2-31 and U3-31 select the link part c in the above mentioned case, so that the web page C linked to the link part c which the maximum number of users want is temporarily selected to be accessed next. In addition, in the user terminal 32, three users U1-32, U2-32 and U3-32 among four users U1-32 to U4-32 select the link part b and one user U4-32 selects the link part d, so that the web page B linked to the link part b is selected temporarily as a link part to be accessed next. Further, only one user U1-33 selects the link part c at the user terminal 33, so that the web page C linked to the link part c which the maximum number of users want is selected temporarily as a link part to be accessed next.

Accordingly, at the two user terminals 31 and 33 among three user terminals 31 to 33, the web page C is temporarily selected as a web page to be accessed next, and at one user terminal 32, the web page B is selected as a web page to be accessed next. Accordingly the web page C is temporarily selected by two user terminals and accordingly selected by the maximum number of user terminals. As a result, the web page C is decided finally as the web page to be accessed next. As described above, a web page to be accessed next sometimes becomes different based on the fact that whether the majority decision is done with user unit basis or user terminal unit basis, even if a web page selected by each user of the user terminals 31 to 33 is the same.

Next the plurality of cursors respectively operated independently by each user of the user terminals 31 to 33 are displayed as described above by superposing on the same web page at the user terminals 31 to 33, and this is done as follows. Namely in the user terminals 31 to 33, a storage area designated as the position representation layer and the all position representation layer is secured in the RAM 14 same as the case in the user terminal 1. In addition, only one storage area corresponding to a display screen of the display for gathering up information of all position representation layer of respective user terminals 31 to 33 is secured in the RAM 14. In the respective user terminals 31 to 33, the storage area secured other than the position representation layer and the all position representation layer is called a whole system position representation layer Sys.

In the embodiment of FIG. 10 in addition, more than one user terminal like the user terminals 31 to 33 are intend for, and in this case, the all position representation layer secured at each of the user terminal is expressed as All-1, Al1-2, . . . All-M, and the whole system position representation layer is also expressed as Sys-1, Sys-2, . . . Sys-M, respectively. When more than one user terminal exists as shown in the embodiment of FIG. 10, one of the user terminals is defined as a master user terminal, and the rest of them are defined as slave user terminals. A m-th (here the m is 1, 2, . . . M) user terminal is defined as a master user terminal, and is called the m-th user terminal. In this case the rest of them are defined as slave user terminals. In this case as shown in FIG. 7A, a plurality of cursors Cur-1, Cur2, . . . Cur-N of the m-th user terminal are written in at corresponding position representation layer Pos-1, Pos-2, . . . Pos-N, respectively at the m-th user terminal as the master. Further, the respective cursor Cur-1 to Cur-N of the position representation layers Pos-1 to Pos-N is written in the all position representation layer All-m as shown in FIG. 7B.

Figure 11:
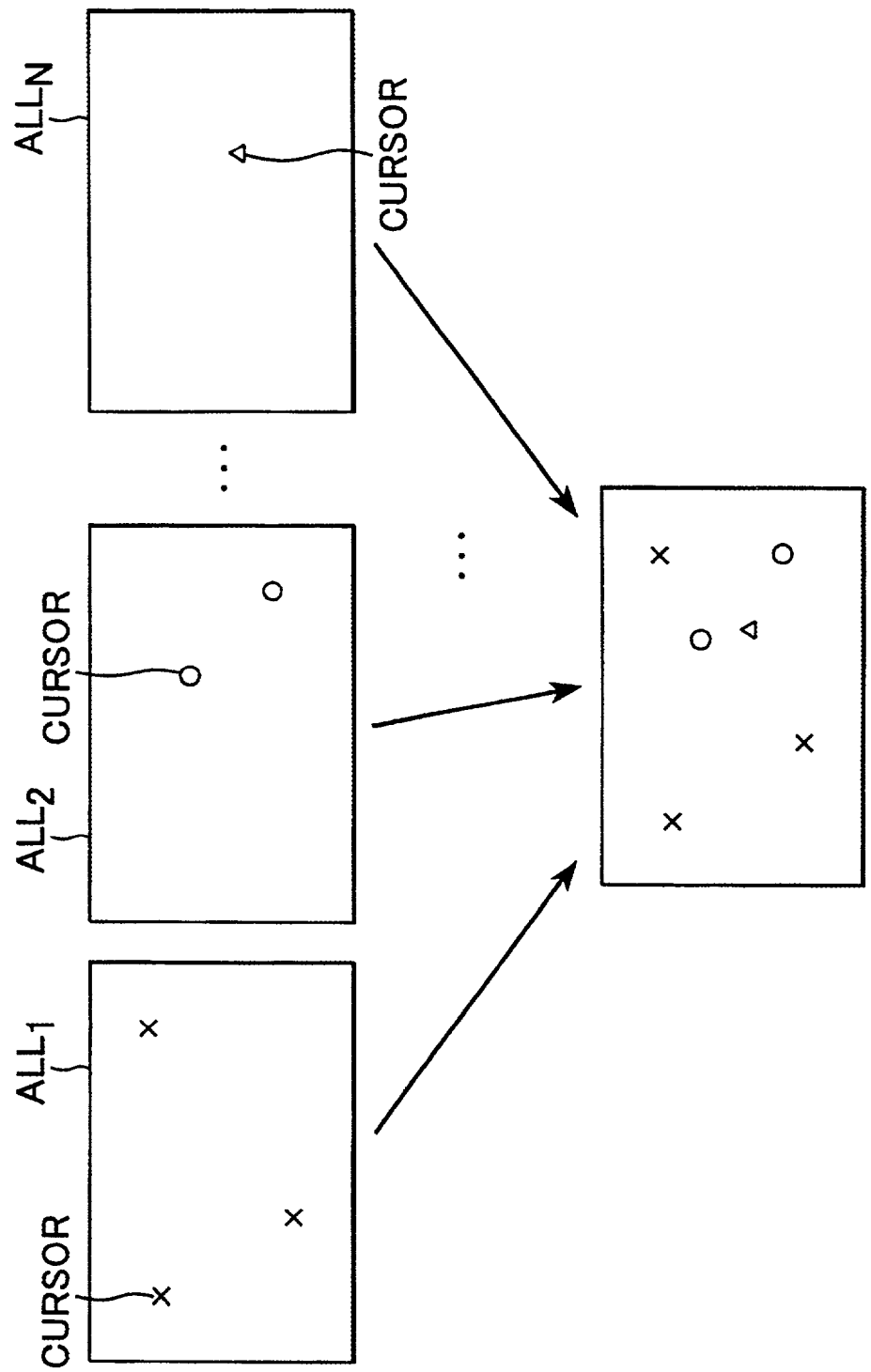
FIG. 11 is a chart for explaining a method for displaying a plurality of cursors on the same web page at more than one user terminal 1.
Figure 12:
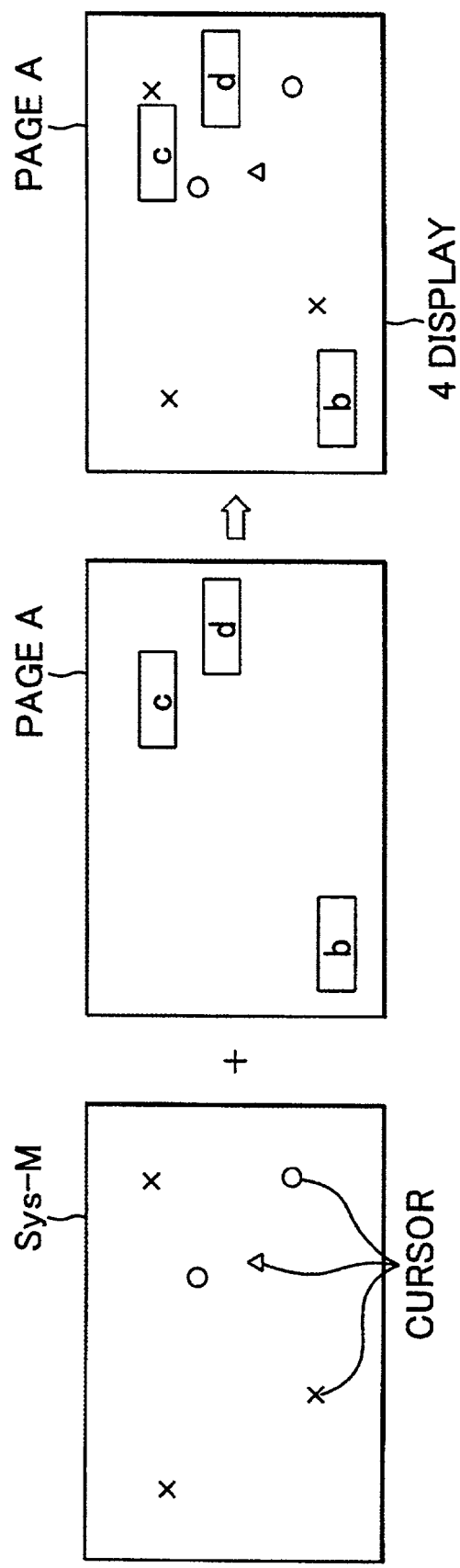
FIG. 12 is a chart for explaining a method for displaying a plurality of cursors on the same web page at more than one user terminal 1.

In addition, at the user terminal of the slave user terminal, a similar writing is done to the position representation layer and the all position representation layer. The all position representation layers All-1, All-2, . . . All-M of all the user terminals are copied to the whole system position representation layer Sys-m in the m-th user terminal as the master as shown in FIG. 11, thereby all image data of the plurality of cursors each operated independently at each of the user terminals is written to the whole system position representation layer Sys-m by this. And the cursors on the whole system position representation layer Sys-m are superposed on the web page (the web page A in the embodiment of FIG. 12) received through the Internet 2 and displayed on the display 24.

In each user terminal of the slave, the whole system position representation layer Sys-m of the m-th user terminal as the master is copied to the whole system position representation layer of each user terminal of the slave, and the cursors and the web page are also displayed same as the m-th user terminal.

Figure 13:
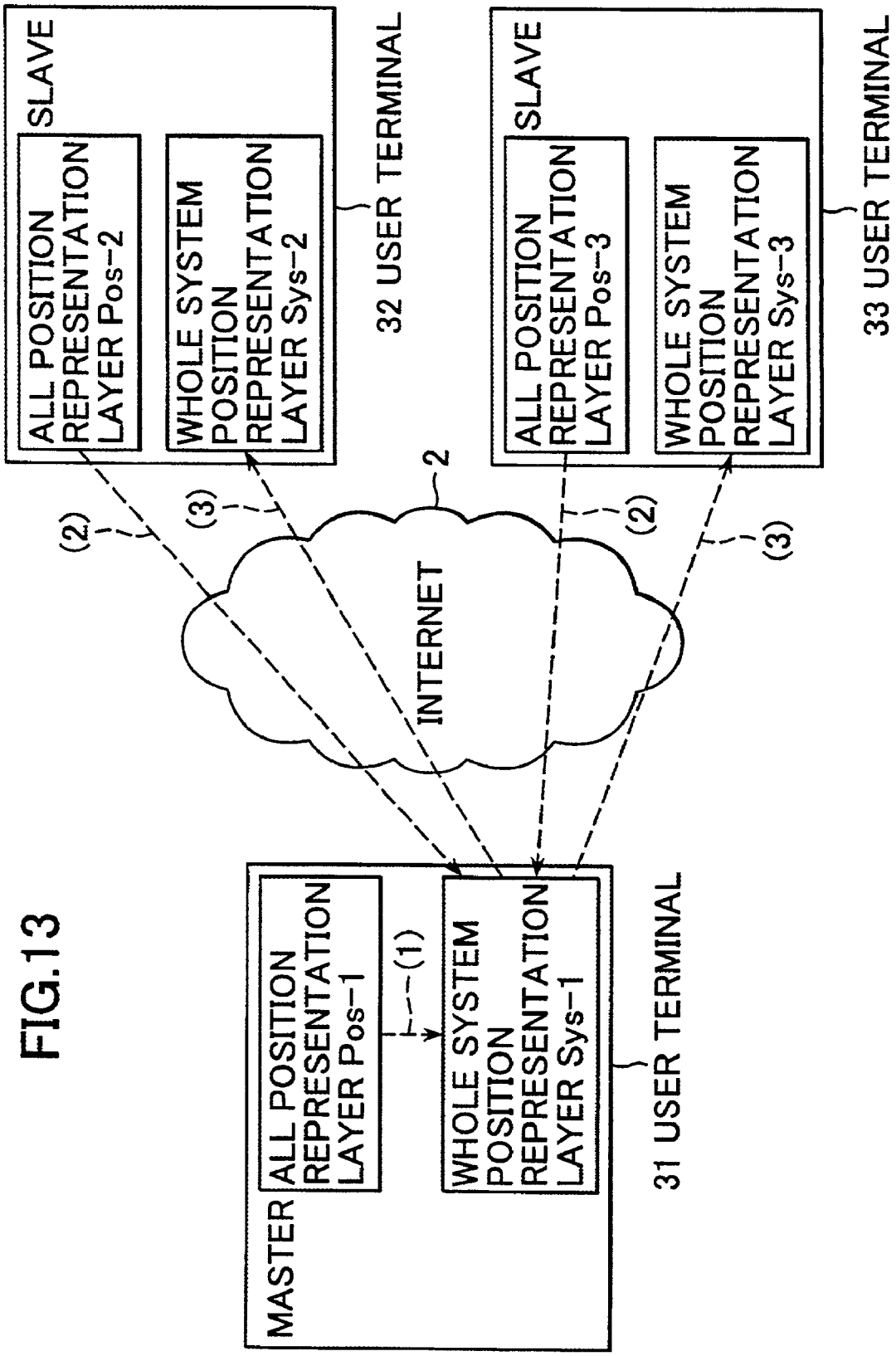
FIG. 13 is a chart for explaining a method for displaying a plurality of cursors on the same web page at more than one user terminal 1.

Namely in the case of the embodiment of FIG. 10, suppose three user terminals 31 to 33 exist and the user terminal 31 is defined as a master and the rest of user terminals 32 and 33 are defined as slaves as shown in FIG. 13. In this case the master user terminal 31 copies the position representation layer Pos-1 to the system position representation layer Sys-1. Further the user terminal 32 acquires the stored contents of the all position representation layer Pos-2 and Pos-3 from the slave user terminal 32 and 33 through the Internet 2, then copies the contents to the system position representation layer Sys-1. After that, the master user terminal 31 transmits the contents of the whole system position representation layer Sys-1 to the slave user terminal 32 and 33 through the Internet 2 and has the slave user terminal 32 and 33 copy the contents to the whole system position representation layer Sys-2 and Sys-3. Thereby, the respective whole system position representation layer Sys-1 to Sys-3 of the user terminal 31 to 33 has the same contents. And, in the user terminals 31 to 33, the plural cursors on the whole system position representation layer Sys-1 to Sys-3 are displayed by superposing on the web page.

As described above, at each user terminal, the plurality of cursors independently operated by each user are displayed on the display 24 by superposing on the web page. Accordingly, in the embodiment of FIG. 10, the cursors for three users U1-31, U2-31 and U3-31 of the user terminal 31, four users U1-32, U2-32, U3-32 and U4-32 of the user terminal 32 and one user U1-33 of the user terminal 33 are all displayed at each of the user terminals 31, 32, 33. In this case, each cursor is displayed at the at the user terminal 31 so as to distinguish not only cursors of the users in the user terminal 31 but also cursors of the users in the user terminals 32 and 33. Namely all cursors are displayed with distinguishable forms and this is also done in the user terminals 32 and 33.

In addition, a selection of the master user terminal among the user terminals 31 to 33 is determined in advance. It is possible to decide to be a master user terminal by selecting a terminal that makes a connection to the Internet 2 first among the user terminals 31 to 33 in one case. In another case, the master user terminal is decided by negotiation among the user terminals 31 to 33 after all user terminals 31 to 33 are connected to the Internet 2. In the respective user terminals 31 to 33, the input processing as shown in FIG. 8 is performed, and in addition, the user terminal which becomes a master user terminal has completed the input processing for becoming a master terminal. Of course the user terminal which becomes a slave user terminal, the input processing for slave user terminal is performed.

Figure 14:
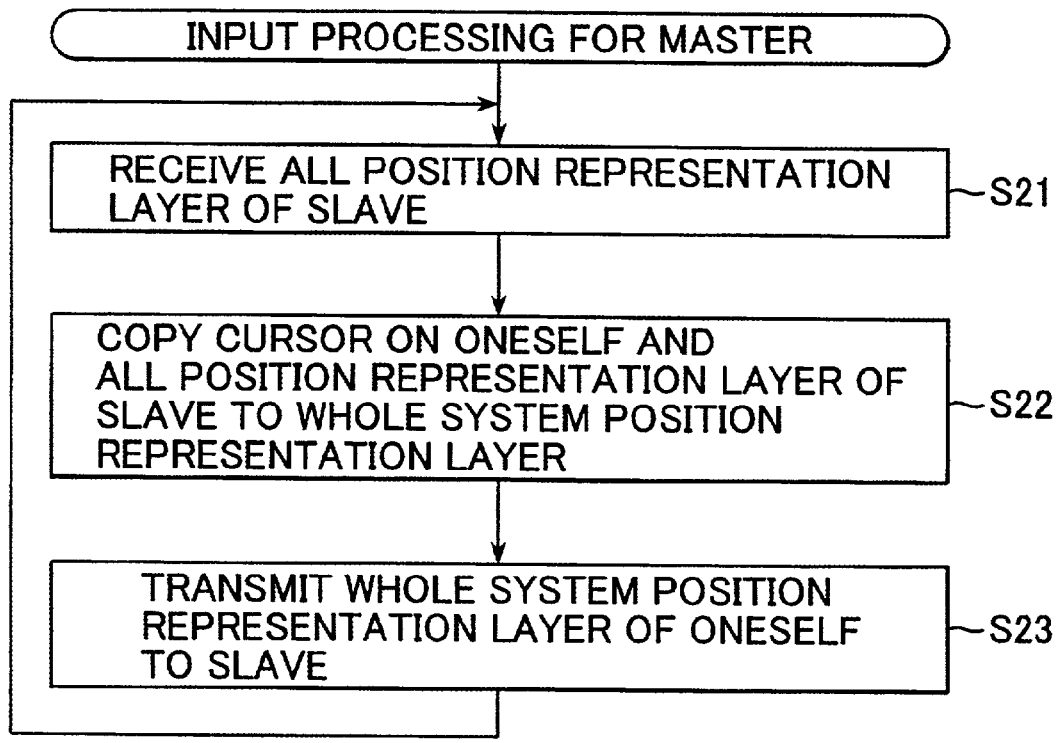
FIG. 14 is a flowchart for explaining an input processing for master.

An input processing for a master user terminal is explained with reference to a flowchart of FIG. 14. In order to simplify the explanation in this specification, more than one user terminal connects to the Internet 2, and one of the user terminals is decided as the master user terminal. In addition, among these user terminals, user terminals except the master user terminal become the slave user terminals. The master user terminal recognizes an IP (Internet Protocol) address of all the slave user terminals and each slave user terminal recognizes an IP address of the master user terminal. And communication between the master user terminal and the slave user terminal are done through the Internet 2 based on these IP addresses.

In this case, a connection to the Internet 2 of a user terminal or an IP address of a user terminal can be recognized by a technique of a messenger system called ICQ (trade mark of Mirabilis company, and means "I seek you") developed by Mirabilis company. For example, elaboration about ICQ is shown at http://www.icq.com/.

At first, at step S21 in the input processing for master, the all position representation layer provided by executing the input processing of FIG. 8 at the slave user terminal is received. Namely the slave user terminal transmits through the Internet 2 the stored contents of the all position representation layer provided by executing the input processing of FIG. 8 to the master user terminal by executing the input processing for slave of FIG. 15 and accordingly the master user terminal receives the stored contents of the all position representation layer transmitted from each slave user terminal at step S21.

And the processing moves to step S22, and the master user terminal copies the stored contents of its own all position representation layer and the stored contents of the all position representation layer of each slave received at step S21 to its own whole system position representation layer, then the processing moves to step S23.

At step S23, the master user terminal transmits the stored contents of its own whole system position representation layer acquired at step S22 to respective slave user terminals through the Internet 2. And the master user terminal waits for the next all position representation layer to be transmitted from each slave user terminal, and then the processing moves back to step S21, and similar processing is repeated.

Figure 15:
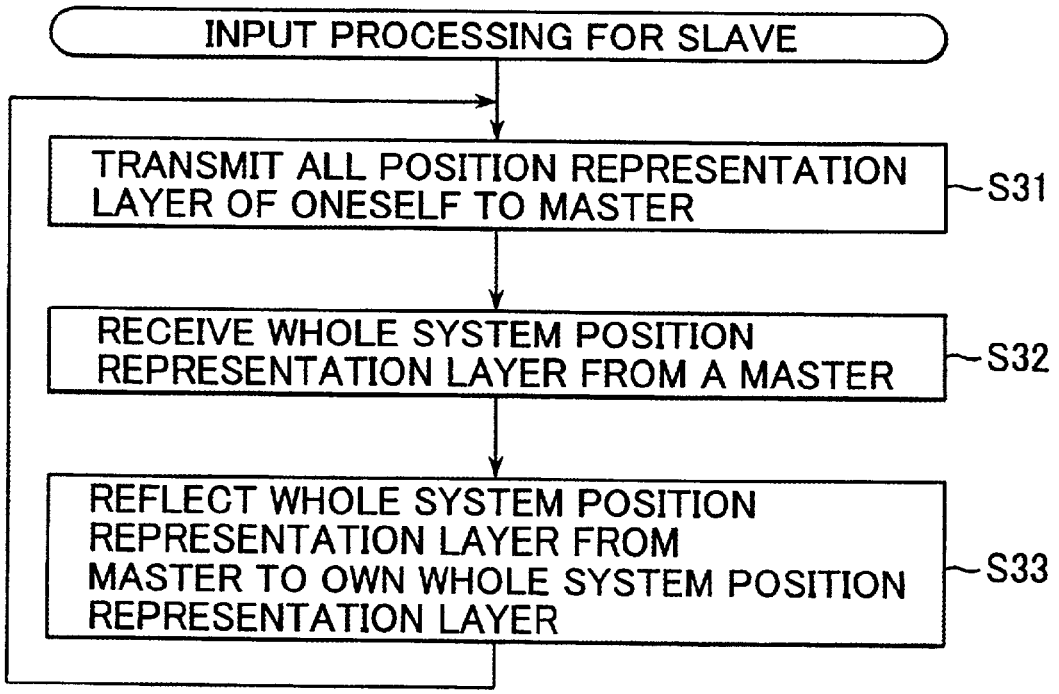
FIG. 15 is a flowchart for explaining an input processing for slave.

The input processing for the slave user terminal is explained with reference to FIG. 15 next. At first, the stored contents of the all position representation layer acquired by the input processing in FIG. 8 for the slave user terminal in the input processing for slave are transmitted to the master user terminal through the Internet 2 at step S31. And, the master user terminal waits the stored contents of whole system position representation layer of the master user terminal acquired by executing the input processing for the master of FIG. 14 to be transmitted through the Internet 2, and the processing moves to step S32. Then the slave user terminal receives the stored contents of the whole system position representation layer of the master user terminal at step S32, and the processing moves to step S33.

The slave user terminal copies the stored contents of the whole system position representation layer of the master user terminal received at step S32 to its own whole system position representation layer at step S33. Then the slave user terminal waits for acquisition of the next all position representation layer by executing the input processing of FIG. 8, the processing moves back to step S31 and the processing is repeated. The plurality of cursors of the master user terminal and all the slave user terminals are reflected in the whole system position representation layer of the master user terminal and the whole system position representation layer of the each slave user terminal by the input processing for master and the input processing for slave.

Figure 16:
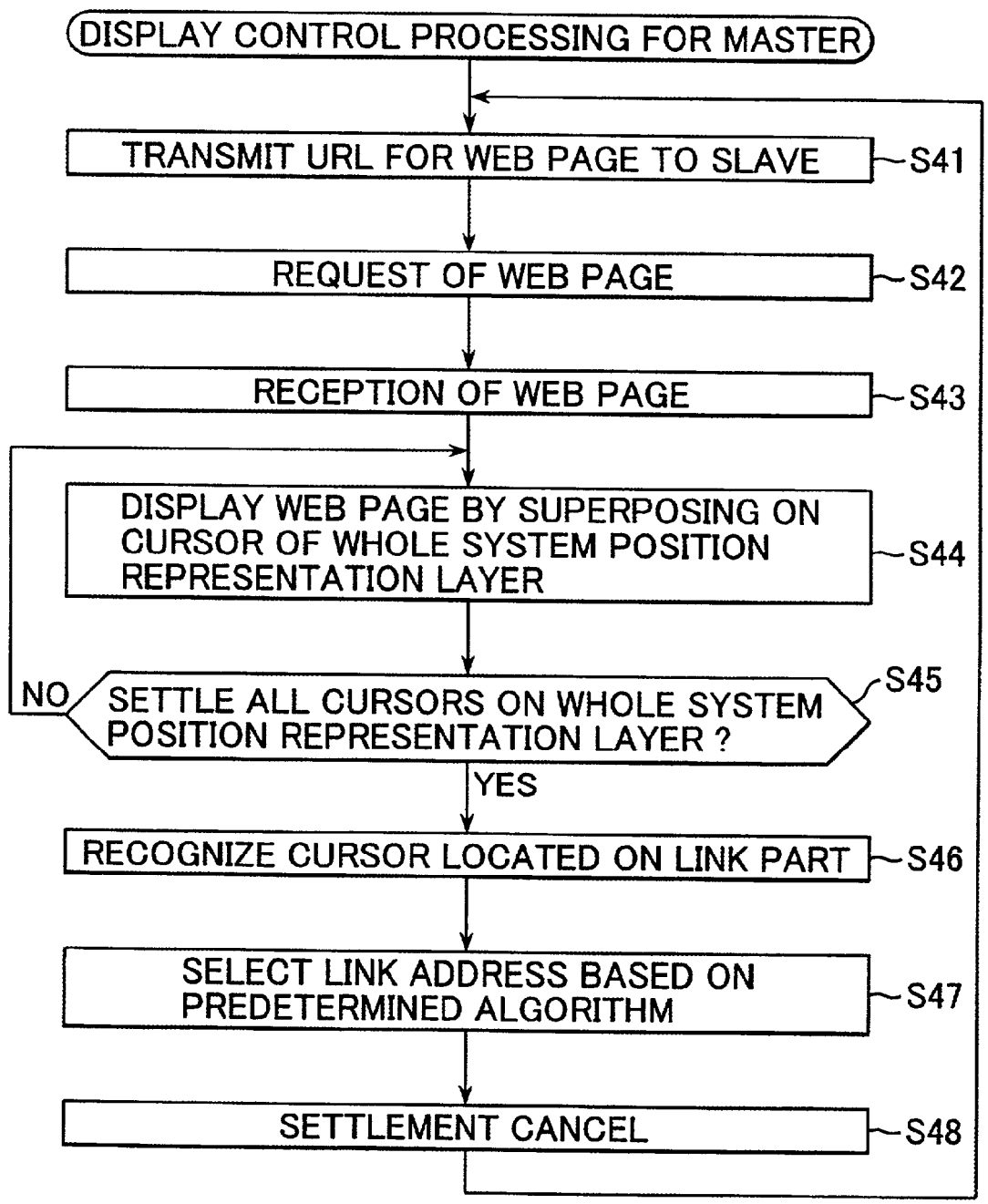
FIG. 16 is a flowchart for explaining a display control processing for master.

A display control processing for master is executed instead of the display control processing of FIG. 9 at the master user terminal among a plurality of user terminals. The display control processing for master is explained with reference to a flowchart of FIG. 16. The master user terminal transmits at first a URL of a predetermined web page to each slave user terminal through the Internet 2 and then the processing moves to step S42 in the display control processing for master. At step S42, the master user terminal requests the web page corresponding to the URL transmitted at step S41 to each slave user terminal to the WWW server 3. Then the master user terminal waits for the web page to be transmitted through the Internet 2 from the WWW server 3, and the processing moves to step S43 and then receives the web page.

The processing moves to step S44 at the master user terminal, and the whole system position representation layer is displayed by superposing on the web page from the WWW server 3. As all the cursors operated at the master and slave user terminals are stored in the whole system position representation layer of the master user terminal by executing both the input processing of FIG. 8 and the input processing for master of FIG. 14, such that all cursors and the web page are to be displayed on the display of the master user terminal in superposed form, because all cursors operated with all masters and slave are memorized by this.

And the processing moves to step S45, and, the master user terminal judges whether all positions of cursors on the whole system position representation layer are settled. In this case, all the positions are not settled at this step S45, the processing moves back to step S44 and similar processing is repeated. On the other hand, when all positions of cursors of the all whole system position representation layer are judged to be settled at step S45, the processing moves to step S46. In this case the master user terminal recognizes a cursor positioned at a link part of a displayed web page same as a case in step S15 of FIG. 9, and the processing moves to step S47.

The master user terminal selects a web page to be accessed next among web pages linked to each link part based on the recognition result of the settled cursor on each link part same as the case at step S16 of FIG. 9, and according to an algorithm of the majority decision, and then the processing moves to step S48. In step S48, the master user terminal requests a settlement cancel for the input processing of FIG. 8, and return the processing to step S41. In this case at step S41, the URL of the web page selected just before at step S47 is transmitted to each slave user terminal, and similar processing is repeated.

Figure 17:
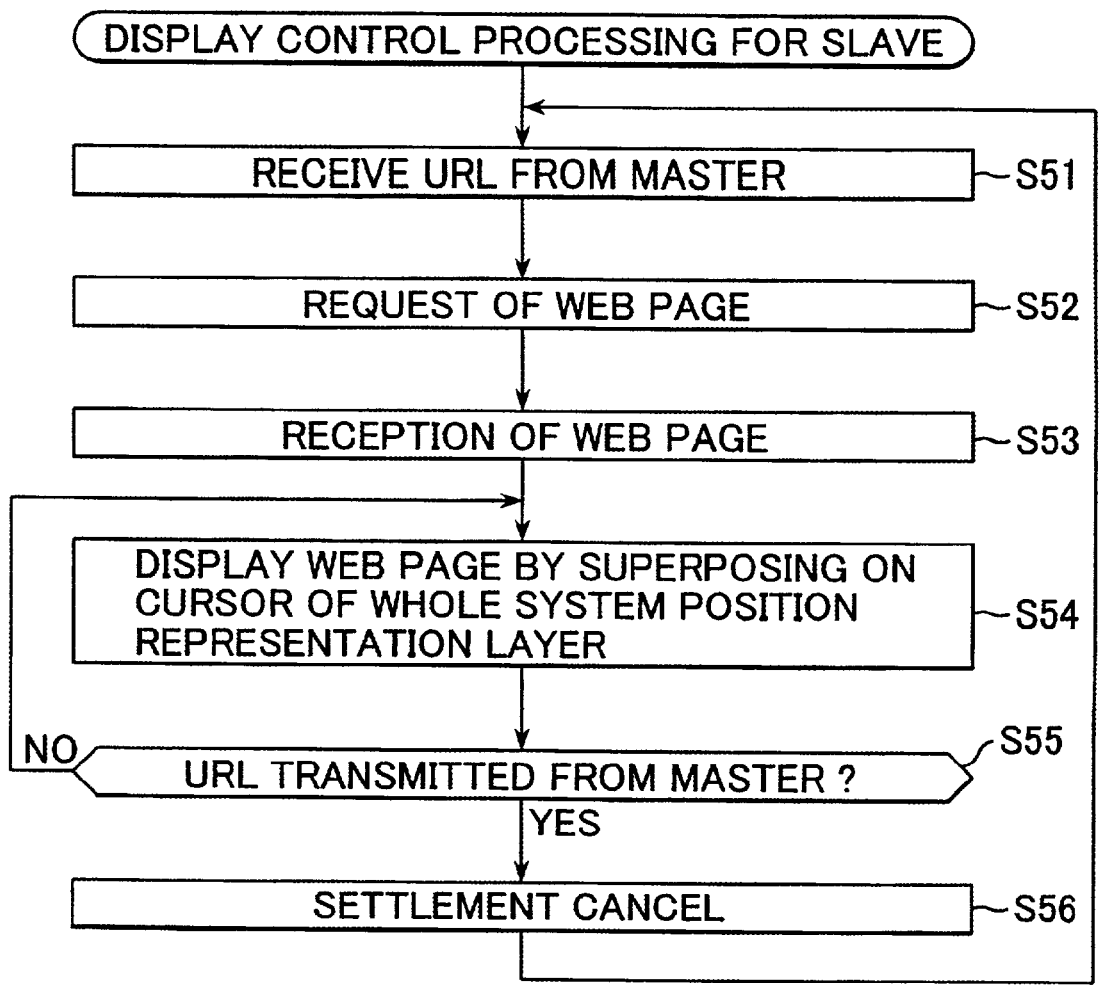
FIG. 17 is a flowchart for explaining a display control processing for slave.

A display control processing for slave is executed instead of the display control processing of FIG. 9 at each slave user terminal among a plurality of user terminals. A display control processing for slave is explained with reference to FIG. 17 next. At first, the slave user terminal receives the URL transmitted from the master user terminal by executing the display control processing for master of FIG. 16 at step S51, then the processing moves to step S52. At step S52, the slave user terminal requests the web page corresponding to the URL received from the master user terminal at step S51 to the WWW server 3. Then the slave user terminal awaits the web page transmitted from the WWW server 3 through the Internet 2, and then receives the web page at step S53.

Accordingly, in each slave user terminal, the web page which is same as the master user terminal display is received. Then the processing moves to step S54, the slave user terminal displays the whole system position representation layer on the web page from the WWW server 3. In the whole system position representation layer of the master user terminal, all cursors operated by the master user terminal and the slave user terminals are stored by executing the input processing of FIG. 8 and the input processing for slave of FIG. 15, and accordingly all cursors and the web page are displayed as same as the case in the master user terminal. Therefore, the same image is displayed at the master user terminal and all the slave user terminals.

Then the processing moves to step S55, and the slave user terminal judges whether a new URL is transmitted from the master user terminal. Namely once the master user terminal decides which web page to be accessed next as described in FIG. 16, the master user terminal transmits the URL for the web page to be accessed next, and accordingly the slave user terminal judges whether the new URL is transmitted from the master user terminal as step S55.

When it is judged that a new URL is not transmitted from the master user terminal at step S55, namely all positions of cursors of the master user terminal and the slave user terminals are not settled and a web page to be accessed next is not selected by the master user terminal, the processing moves back to step S54 and similar processing is repeated.

In addition, when it is judged that a new URL is transmitted from the master user terminal at step S55, the processing moves to step S56, and the slave user terminal requests the settlement cancel for the input processing of FIG. 8, then, the processing returns to step S51. In this case, at step S51, the new URL (URL of the web page to be accessed next) transmitted from the master user terminal is received by the slave user terminal, and similar processing is repeated.

Accordingly, each of the user terminals can browse the same web page, and further each user of the user terminals can enter the selection input for a web page to be accessed next based on their own desire. In this case, if a web page to be accessed next is in disagreement, one of web pages is selected by the majority decision and the like, and thus the selected web page is finally displayed. As a result, all users can join to select a web page to be accessed next while watching the settlement operation of all the cursors operated by all users, even if each user lives in a remote location.

In the case of the embodiment as described above, the master user terminal transmits the URL of the web page to each slave user terminal, and each slave user terminal acquires the web page corresponding to the URL transmitted from the master user terminal. However, alternately the master user terminal transmits the IP address of each slave user terminal to the WWW server 3, and then the WWW server 3 can transmit the web page based on the IP address from the master user terminal to each slave user terminal in a so-called push mode.

In addition, in the case of the above embodiment, one of the user terminals is defined as the master user terminal and the rest of the user terminals are defined as the slave user terminals. But as shown in FIG. 10 by a dotted line, a master server 4 functioning as a master user terminal is provided on the Internet 2 and all user terminals are able to be defined as the slave user terminals.

Figure 18:
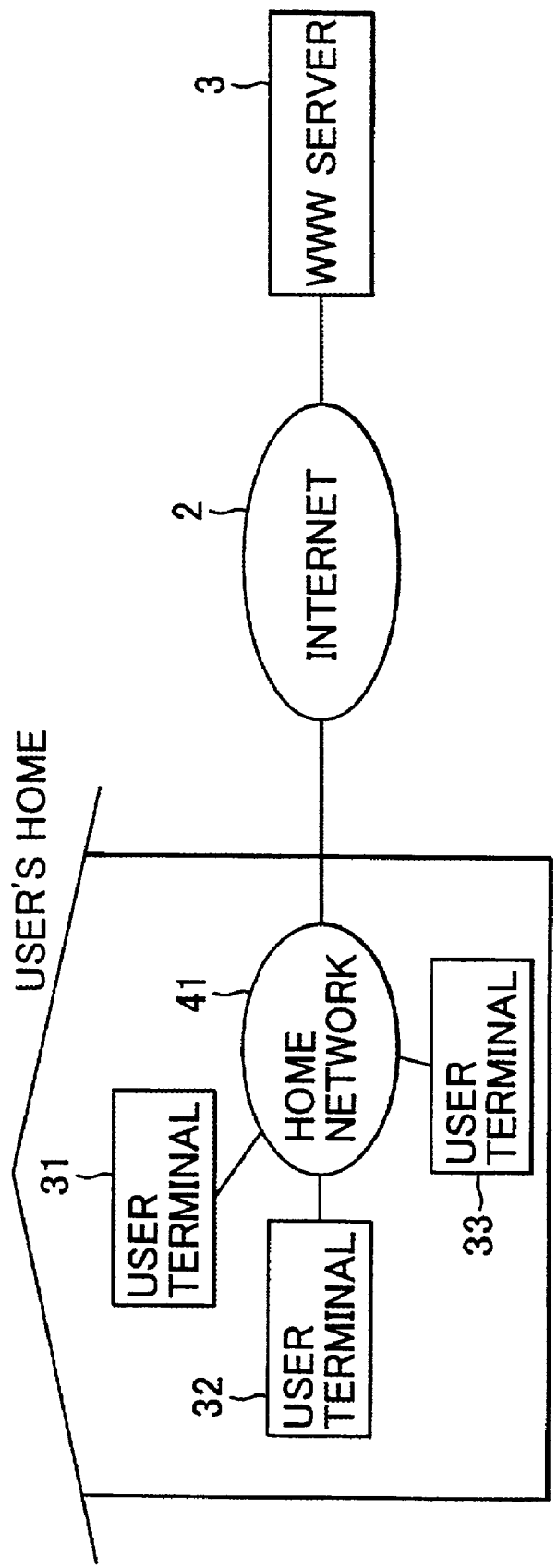
FIG. 18 is a construction example of a third embodiment of an information system to which the present invention is applied.

FIG. 18 shows a third embodiment of the information system of this invention. In the figure, corresponding portions in FIG. 10 are the same in FIG. 18 and the explanation to such portions is omitted hereby using the same reference numerals. Namely the information system of FIG. 18 is constituted same as in FIG. 10 except that the home network 41 is newly provided.

The home network 41 is a local area network constituted as a SOHO (Small Office Home Office) at a user's home, and mutually connects the user terminals 31 to 33. The home network 41 is connected to the Internet 2, and accordingly in the embodiment of FIG. 18, the system is constructed similar to the system of FIG. 1 except that the user terminals 31 to 33 access the Internet 2 by way of the home network 41. Accordingly, the explanation is omitted here.

Figure 19:
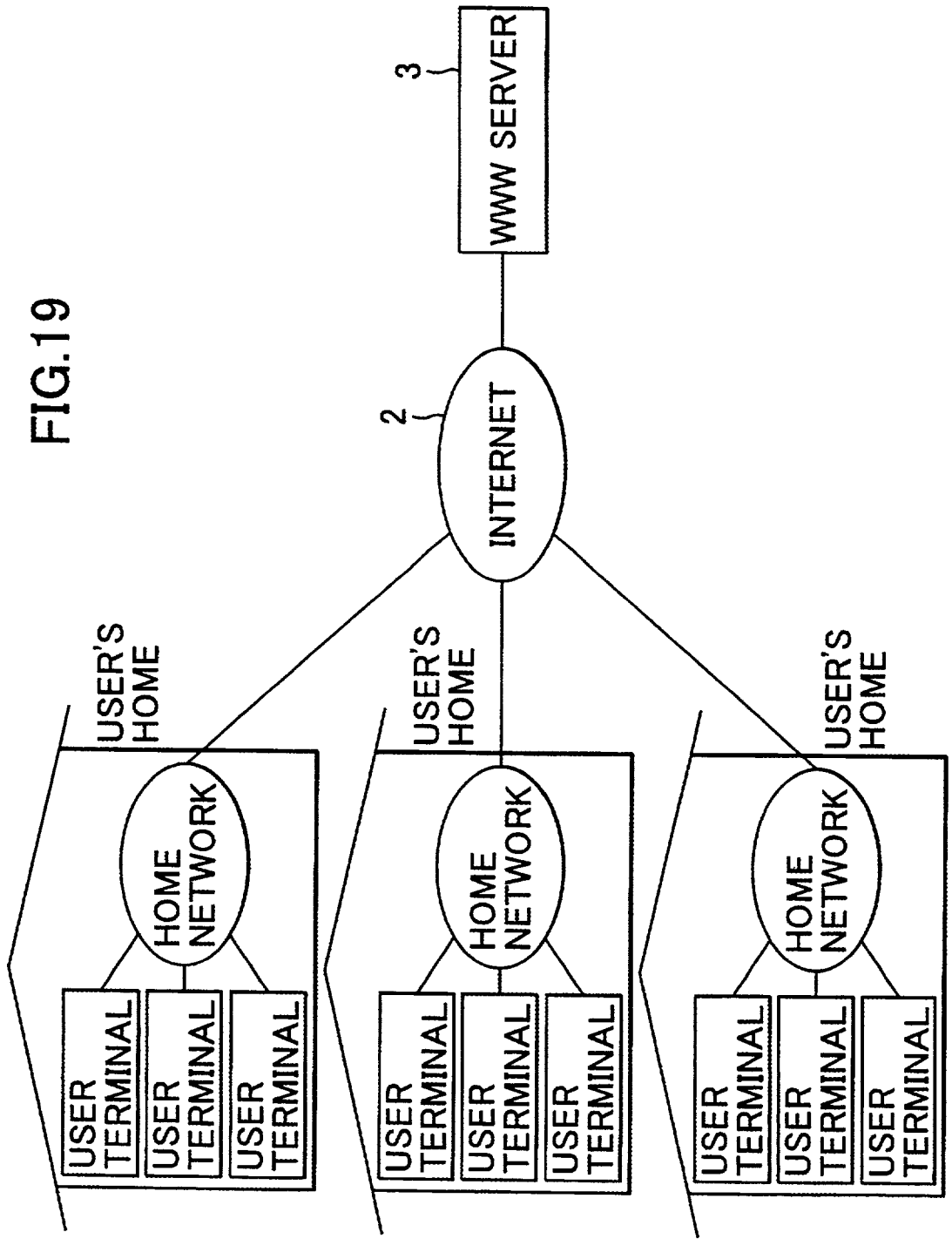
FIG. 19 is a construction example of a fourth embodiment of an information system to which the present invention is applied.

FIG. 19 shows a construction of a fourth embodiment of the information system of this invention. In the embodiment of FIG. 19, a plurality of user's home, where more than one user terminal is connected to a home network, is connected to the Internet 2, and accordingly all users of the plural user's homes can select a web pages while watching the selecting operations by other users. The above is described in the case of browsing web pages, but this invention can be applied to a case where information linked to more than one other information is displayed.

Figure 20:
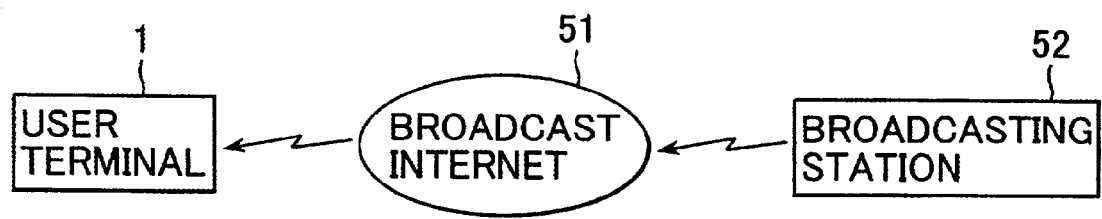
FIG. 20 is a construction example of one embodiment of a broadcasting system to which the present invention is applied.

FIG. 20 shows one embodiment of the present invention applied to a broadcasting system. From a broadcasting station 52, EPG (Electric Program Guide) data of a broadcast program is broadcasted through a broadcast network 51 of ground wave broadcasting, a broadcast satellite or a CATV (Cable Television) network. This broadcast program and the data of the EPG are received by the user terminal 1 and displayed.

In the broadcasting system as described above, data for the broadcast program is linked to the broadcast programs at an introduction column of each displayed by the EPG data of the broadcast program. In addition, in the user terminal 1, more than one cursor which each user operates is displayed in addition to the EPG data. And the program introduction field of the EPG is pointed out by more than one cursor, then a broadcast program corresponding to the program introduction field pointed out by the most number of cursors is selected, and displayed as shown in FIG. 21. Accordingly in this case, a family can decide the program to be viewed by the majority decision at home.

In addition, this invention is applied to an interactive television system, and further this invention can be applied to a game or the like, where a progress direction of the story of the game is decided by the majority decision while a story having options expressed with a tree like structure is prepared in advance at each game scene.

In this specification, the processing steps to describe a program for executing various processing by a personal computer as user terminal 31,32,33, are not necessary to be executed in a time sequential manner along with the order mentioned in the flowchart, and these processing steps may be executed in parallel or individually like a concurrent processing or an object oriented processing.

In addition, the program may be executed by a single computer or may be executed by more than one computer with distributed processing. Furthermore, the program can be forwarded to a computer located at a remote place, and may be executed there.

What is claimed is:

1. A display control apparatus for controlling display of information comprising:
    display control means for displaying linking information, that is linked to content information, and displaying a plurality of cursors operating on one or more display devices;
    selecting means for selecting at least a portion of said content information as a function of a corresponding designation by at least two of said plurality of cursors; and
    acquisition means for acquiring said selected content information as a function of the at least two cursors,
    wherein each cursor has a predetermined priority value which can be varied at a subsequent use; and
    wherein said selection of content information is determined by a majority decision weighted with said priority value of said cursors and the other information selected by another cursor among said plurality of cursors is displayed within an alternative window.

2. The display control apparatus as claimed in claim 1, wherein said display control means displays said selected content information on said display device.

3. The display control apparatus as claimed in claim 1, further comprising:
    operation means adapted to generate operation signals to operate each of the plurality of cursors,
    wherein said display control means displays, on said display device, each of the plurality of cursors, as a function of said operation signals.

4. The display control apparatus as claimed in claim 1, wherein said display control means is adapted to uniquely display each of said plurality of cursors.

5. The display control apparatus as claimed in claim 1, wherein said linking information is described using a language for a predetermined image description.

6. The display control apparatus as claimed in claim 1, wherein said acquisition means acquires additional information from a network.

7. The display control apparatus as claimed in claim 1, wherein said acquisition means is a browser.

8. A display control method for displaying information, comprising the steps of:
    displaying information accessed by manipulating two or more cursors;
    selecting a portion of the information designated by the two or more cursors; and
    acquiring said selected information as a function of data associated with the two or more cursors,
    wherein each cursor has a predetermined priority value which can be varied at a subsequent use;
    determining said selection of content information as a function of a majority decision weighted with said priority value of said cursors and the other information selected by another cursor among said plurality of cursors is displayed within an alternative window.

9. A computer readable media storing a computer program for executing a display control process for controlling display of information, said computer program comprising the steps of:

displaying linking information accessed by at least two cursors;

selecting at least a portion of content information, linked to the linking information, that is displayed and is designated by at least two cursors; and acquiring said selected information as a function of data associated with the at least two cursors, wherein each cursor has a predetermined priority value which can be varied at a subsequent use;

determining said selection of content information as a function of a majority decision weighted with said priority value of said cursors and the other information selected by another cursor among said plurality of cursors is displayed within an alternative window.

10. A computer readable media storing program code for a display control processing for controlling display of information to be executed by a computer, said program code comprising:

a displaying step for displaying linking information, that is linked to content information, and displaying a plurality of cursors operating on one or more display devices;

a selecting step for selecting at least a portion of said content information as a function of a corresponding designation by at least two of said plurality of cursors; and an acquiring step for acquiring said selected content information as a function of the at least two cursors, wherein each cursor has a predetermined priority value which can be varied at a subsequent use;

a determining step of determining said selection of content information as a function of a majority decision weighted with said priority value of said cursors and the other information selected by another cursor among said plurality of cursors is displayed within an alternative window.

11. The display control apparatus as claimed in claim 1, wherein said priority values of said cursors vary inversely to said selection of content information.

12. The display control method as claimed in claim 8, further comprising the step of varying said priority value of said cursors inversely to said selection of content information.

13. The computer readable media as claimed in claim 9, wherein the computer program further comprise the step of varying said priority value of said cursors inversely to said selection of content information.

14. The computer readable media as claimed in claim 10, wherein the program code further comprises the step of varying said priority value of said cursors inversely to said selection of content information.

15. The display control apparatus as claimed in claim 1, wherein said priority values of said cursors vary as a function of said designation of content information of said cursors and said selection of content information.

* * * * *

UNITED STATES PATENT AND TRADEMARK OFFICE
CERTIFICATE OF CORRECTION

| | |
|---|---|
| PATENT NO. | : 7,620,900 B2 |
| APPLICATION NO. | : 09/841957 |
| DATED | : November 17, 2009 |
| INVENTOR(S) | : Kawashima et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Twenty-sixth Day of October, 2010

David J. Kappos
*Director of the United States Patent and Trademark Office*